US012680875B2

(12) United States Patent
Funayama et al.

(10) Patent No.: US 12,680,875 B2
(45) Date of Patent: Jul. 14, 2026

(54) CHART, MANUFACTURING METHOD, DETERMINATION SYSTEM, DETERMINATION METHOD, AND RECORDING MEDIUM

(71) Applicant: NEC Corporation, Tokyo (JP)

(72) Inventors: Chisato Funayama, Tokyo (JP); Masato Tsukada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 280 days.

(21) Appl. No.: 18/563,432

(22) PCT Filed: May 28, 2021

(86) PCT No.: PCT/JP2021/020541
§ 371 (c)(1),
(2) Date: Nov. 22, 2023

(87) PCT Pub. No.: WO2022/249485
PCT Pub. Date: Dec. 1, 2022

(65) Prior Publication Data
US 2024/0264000 A1      Aug. 8, 2024

(51) Int. Cl.
G01J 3/52          (2006.01)
G01J 3/10          (2006.01)
(Continued)

(52) U.S. Cl.
CPC .................. G01J 3/52 (2013.01); G01J 3/108 (2013.01); G01J 3/42 (2013.01); G01J 3/50 (2013.01);
(Continued)

(58) Field of Classification Search
CPC ...... G01J 3/52; G01J 3/108; G01J 3/42; G01J 3/50; G01J 2003/425; G01J 5/00;
(Continued)

(56) References Cited

U.S. PATENT DOCUMENTS

2008/0088826 A1      4/2008  Oyama et al.
2012/0076375 A1      3/2012  Saijo et al.
(Continued)

FOREIGN PATENT DOCUMENTS

CN          101120878 A  *  2/2008  ............. A61B 5/441
JP          S61-288685 A      12/1986
(Continued)

OTHER PUBLICATIONS

International Search Report for PCT Application No. PCT/JP2021/020541, mailed on Aug. 17, 2021.
(Continued)

*Primary Examiner* — Md M Rahman
(74) *Attorney, Agent, or Firm* — Sughrue Mion, PLLC

(57)          ABSTRACT
A chart includes: a substrate; a first skin reflection patch part that is formed on the substrate and that simulates reflection of near-infrared rays of a predetermined wavelength, in a skin of a living body of a first skin color; and a second skin reflection patch part that is formed on the substrate and that simulates reflection of the near-infrared rays of the predetermined wavelength, in the skin of the living body of a second skin color that is different from the first skin color. According to such a chart, it is possible to properly determine whether or not an imaging environment of an image is suitable for biometric authentication.

12 Claims, 24 Drawing Sheets

(51) Int. Cl.

| | |
|---|---|
| *G01J 3/42* | (2006.01) |
| *G01J 3/50* | (2006.01) |
| *G06T 7/90* | (2017.01) |
| *G06V 40/10* | (2022.01) |

(52) U.S. Cl.
CPC ........... *G06T 7/90* (2017.01); *G01J 2003/425* (2013.01); *G06V 40/10* (2022.01)

(58) Field of Classification Search
CPC ........ G06T 7/90; G06V 40/10; G06V 10/141; G01M 11/00; G01N 21/01
USPC .......................................................... 356/51
See application file for complete search history.

(56) References Cited

U.S. PATENT DOCUMENTS

| | | | |
|---|---|---|---|
| 2016/0379095 A1 | 12/2016 | Nozawa | |
| 2017/0142309 A1 | 5/2017 | Hayashi et al. | |
| 2018/0053044 A1 | 2/2018 | Su et al. | |
| 2020/0219234 A1 | 7/2020 | Sotodate | |
| 2020/0314290 A1 | 10/2020 | Yokouchi | |
| 2020/0408598 A1* | 12/2020 | Toda | H10F 39/806 |
| 2023/0310337 A1* | 10/2023 | Sulzer | A61P 1/00 |
| | | | 424/443 |
| 2024/0115487 A1* | 4/2024 | Birjandi Nejad | A61Q 17/04 |
| 2024/0389874 A1* | 11/2024 | Schwarz | A61B 5/02427 |

FOREIGN PATENT DOCUMENTS

| | | | |
|---|---|---|---|
| JP | H11-272179 A | | 10/1999 |
| JP | 2003-111108 A | | 4/2003 |
| JP | 2007-133560 A | | 5/2007 |
| JP | 2008-099218 A | | 4/2008 |
| JP | 2012-068762 A | | 4/2012 |
| JP | 2016-173353 A | | 9/2016 |
| JP | 2017-009461 A | | 1/2017 |
| JP | 2017-034444 A | | 2/2017 |
| JP | 2018-059803 A | | 4/2018 |
| JP | 2019-139433 A | | 8/2019 |
| JP | 2019-213851 A | | 12/2019 |
| JP | 2020-113844 A | | 7/2020 |
| JP | 2020-159821 A | | 10/2020 |
| WO | 2016/147272 A1 | | 9/2016 |

OTHER PUBLICATIONS

Suzuki, Yasuhiro et al., "Detection Method of Skin Region by Near-IR Spectrum Multi-Band", IEEJ Transactions on Electronics, Information and Systems., 2007, vol. 127, No. 4, pp. 583-590.

JP Office Action for JP Application No. 2023-523939, mailed on Jul. 8, 2025 with English Translation.

JP Decision of Dismissal of Amendment for JP Application No. 2023-523939, mailed on Jan. 6, 2026 with English Translation.

* cited by examiner

S601

S602

S603

CHART, MANUFACTURING METHOD, DETERMINATION SYSTEM, DETERMINATION METHOD, AND RECORDING MEDIUM

This application is a National Stage Entry of PCT/JP2021/020541 filed on May 28, 2021, the contents of all of which are incorporated herein by reference, in their entirety.

TECHNICAL FIELD

This disclosure relates to technical fields of a chart, a manufacturing method, a determination system, a determination method, and a recording medium.

BACKGROUND ART

A known chart of this type is a skin color chart that displays a color of a human skin. For example, Patent Literature 1 discloses a technique/technology of measuring average spectral reflectance in the human skin and creating the skin color chart on the basis of the spectral reflectance.

As another related technique/technology, Patent Literature 2 discloses a technique/technology of creating a near-infrared image from a color face image. Patent Literature 3 discloses a technique/technology of detecting a target object in an image by utilizing reflective properties in an infra-red area.

CITATION LIST

Patent Literature

Patent Literature 1: JP2003-111108A
Patent Literature 2: JP2007-133560A
Patent Literature 3: JP2008-099218A

SUMMARY

Technical Problem

This disclosure aims to improve the techniques/technologies disclosed in Citation List.

Solution to Problem

A chart according to an example aspect of this disclosure includes: a substrate: a first skin reflection patch part that is formed on the substrate and that simulates reflection of near-infrared rays of a predetermined wavelength, in a skin of a living body of a first skin color: and a second skin reflection patch part that is formed on the substrate and that simulates reflection of the near-infrared rays of the predetermined wavelength, in the skin of the living body of a second skin color that is different from the first skin color.

A method of manufacturing a chart according to an example aspect of this disclosure includes: forming, on a substrate, a first skin reflection patch part that simulates reflection of near-infrared rays of a predetermined wavelength, in a skin of a living body of a first skin color: and forming, on the substrate, a second skin reflection patch part that simulates reflection of the near-infrared rays of the predetermined wavelength, in the skin of the living body of a second skin color that is different from the first skin color.

A determination system according to an example aspect of this disclosure includes: an imaging unit: a lighting apparatus that applies near-infrared rays of a predetermined wavelength to an imaging target of the imaging unit: and a determination unit that determines whether or not a light environment in imaging by the imaging unit is suitable for biometric authentication, on the basis of an image that is captured by applying the near-infrared rays of the predetermined wavelength to a chart, which includes: a substrate: a first skin reflection patch part that is formed on the substrate and that simulates reflection of near-infrared rays of a predetermined wavelength, in a skin of a living body of a first skin color: and a second skin reflection patch part that is formed on the substrate and that simulates reflection of the near-infrared rays of the predetermined wavelength, in the skin of the living body of a second skin color that is different from the first skin color.

A determination method according to an example aspect of this disclosure is a determination method that is executed by a computer, the determination method including: capturing an image by applying near-infrared rays of a predetermined wavelength to a chart, which includes: a substrate: a first skin reflection patch part that is formed on the substrate and that simulates reflection of near-infrared rays of a predetermined wavelength, in a skin of a living body of a first skin color: and a second skin reflection patch part that is formed on the substrate and that simulates reflection of the near-infrared rays of the predetermined wavelength, in the skin of the living body of a second skin color that is different from the first skin color: and determining whether or not a light environment in capturing the image is suitable for biometric authentication, on the basis of the image.

A recording medium according to an example aspect of this disclosure is a recording medium on which a computer program that allows a computer to execute a determination method is recorded, the determination method including: capturing an image by applying near-infrared rays of a predetermined wavelength to a chart, which includes: a substrate: a first skin reflection patch part that is formed on the substrate and that simulates reflection of near-infrared rays of a predetermined wavelength, in a skin of a living body of a first skin color: and a second skin reflection patch part that is formed on the substrate and that simulates reflection of the near-infrared rays of the predetermined wavelength, in the skin of the living body of a second skin color that is different from the first skin color: and determining whether or not a light environment in capturing the image is suitable for biometric authentication, on the basis of the image.

DESCRIPTION OF EXAMPLE EMBODIMENTS

Hereinafter, a chart, a manufacturing method, a determination system, a determination method, and a recording medium according to example embodiments will be described with reference to the drawings.

First Example Embodiment

A chart according to a first example embodiment will be described with reference to FIG. 1 and FIG. 2.
(Configuration of Chart)

First, a configuration of the chart according to the first example embodiment will be described with reference to FIG. 1. FIG. 1 is a plan view illustrating the configuration of the chart according to the first example embodiment.

Figure 1:
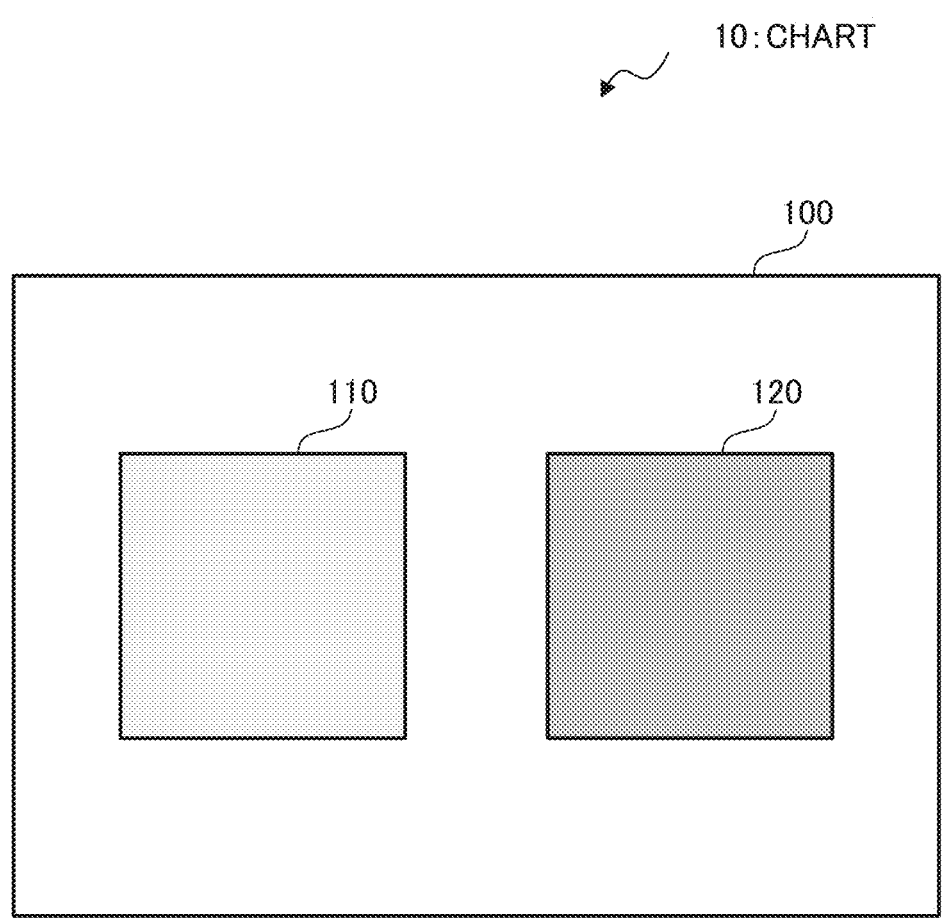
FIG. 1 is a plan view illustrating a configuration of a chart according to a first example embodiment.

As illustrated in FIG. 1, a chart 10 according to the first example embodiment includes a substrate 100, a first skin reflection patch part 110 that is formed on the substrate 100, and a second skin reflection patch part 120.

The substrate 100 is a planar member made of, for example, cardboard, plastic, wood, metal, glass, and combinations thereof. The substrate 100 may be made of a lightweight member, for example, for ease of portability. Furthermore, the substrate 100 may be configured by using a member with low reflectance to near-infrared rays (e.g., a black member). Although the substrate 100 that is rectangular is illustrated here, the shape of the substrate 100 is not particularly limited.

The first skin reflection patch part 110 is configured as a member that simulates reflection of near-infrared rays of a predetermined wavelength, in a skin of a living body of a first skin color. That is, the first skin reflection patch part 110 is configured such that reflectance to the near-infrared rays of the predetermined wavelength is equivalent to that of the skin of the living body of the first skin color. Although illustrated here is an example in which the first skin reflection patch part 110 is formed as a rectangular area, the shape of the first skin reflecting patch part 110 is not particularly limited.

The second skin reflection patch part 120 is configured as a member that simulates reflection of the near-infrared rays of the predetermined wavelength, in the skin of the living body of a second skin color (i.e., a skin color that is different in brightness from the first skin color). That is, the second skin reflection patch part 120 is configured such that the reflectance to the near-infrared rays of the predetermined wavelength is equivalent to that of the skin of the living body of the second skin color. Although illustrated here is an example in which the second skin reflection patch part 120 is formed as a rectangular area, the shape of the second skin reflection patch part 120 is not particularly limited.

As described above, the first skin reflection patch part 110 and the second skin reflection patch part 120 are configured to correspond to different skin colors (e.g., skin colors of different tones and brightness). The first skin color may be set as a skin color with relatively high reflectance (e.g., top 10% of the reflectance), of the skin colors that are assumed to belong to a target person of biometric authentication, for example, and the second skin color may be set as a skin color with relatively low reflectance (e.g., bottom 10% of the reflectance). In addition, the first skin color and the second skin color may be set as a color corresponding to the reflectance that is calculated on the basis of an average value of the reflectance of skins of a plurality of living bodies (e.g., an average value+a predetermined value, an average value−a predetermined value, etc.).

The first skin reflection patch part 110 and the second skin reflection patch part 120 may be formed by using gray ink, for example. For example, the first skin reflection patch part 110 and the second skin reflection patch part 120 may be formed by coating barium sulfate, polytetrafluoroethylene, carbon, silicone paint, or the like on the substrate 100.
(Method of Setting Reflectance)

Next, with reference to FIG. 2, a method of setting the reflectance of the chart 10 according to the first example embodiment will be described. FIG. 2 is a graph illustrating the method of setting the reflectance of the chart according to the first example embodiment.

Figure 2:
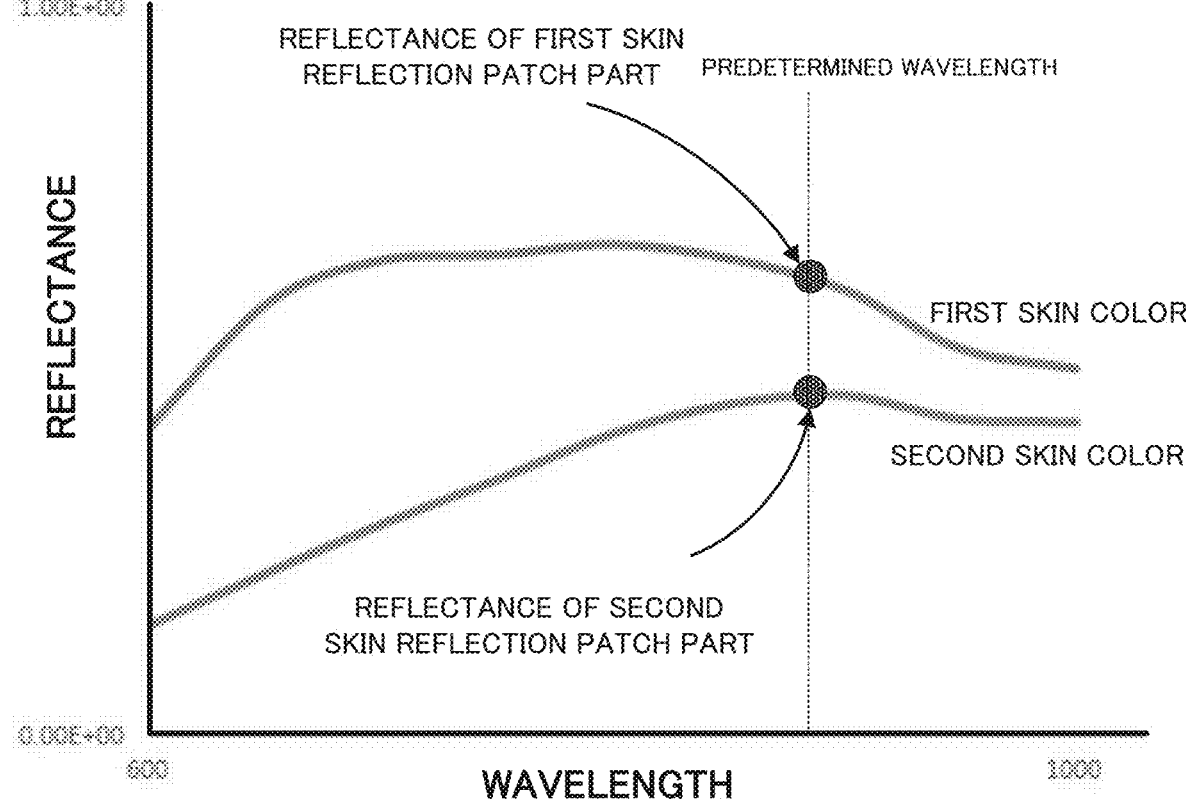
FIG. 2 is a graph illustrating a method of setting reflectance of the chart according to the first example embodiment.

As illustrated in FIG. 2, the reflectance of the chart 10 according to the first example embodiment (i.e., the reflectance of the first skin reflection patch part 110 and the second skin reflection patch part 120) may be set on the basis of spectral reflectance of the skin of the living body. Specifically, the reflectance of the first skin reflection patch part 110 may be set on the basis of the reflectance of the near-infrared rays of the predetermined wavelength, in the skin of the living body of the first skin color (e.g., a relatively bright skin color). The reflectance of the second skin reflection patch part 120 may be set on the basis of the reflectance of the near-infrared rays of the predetermined wavelength, in the skin of the living body of the second skin color (e.g., a relatively dark skin color). A specific example of the predetermined wavelength will be described in another example embodiment later.

The first example embodiment describes an example in which two types of skin reflection patch parts are provided, but the number of skin reflection patch parts is not particularly limited. For example, three or more types of skin reflection patch parts may be provided. More specifically, in addition to the first skin reflection patch part 110 corresponding to a first wavelength and the second skin reflection patch part 120 corresponding to a second wavelength, a third skin reflection patch part corresponding to a third wavelength and a fourth skin reflection patch part corresponding to a fourth wavelength may be provided.

(Technical Effect)

Next, a technical effect obtained by the chart 10 according to the first example embodiment will be described.

As described in FIG. 1 and FIG. 2, the chart 10 according to the first example embodiment includes the first skin reflection patch part 110 corresponding to the first skin color and the second skin reflection patch part 120 corresponding to the second skin color. By using such a chart 10, it is possible to properly determine whether or not an imaging environment of an image using the near-infrared rays is suitable for biometric authentication using the image. More specifically, an image/appearance condition of a near-infrared image of the living body can be simulated by capturing a near-infrared image of the chart, and it is thus possible to properly determine whether or not a light environment related to the near-infrared rays (e.g., intensity and direction of the near-infrared rays, etc.) is suited to capture the near-infrared image of the living body.

Second Example Embodiment

The chart 10 according to a second example embodiment will be described with reference to FIG. 3 and FIG. 4. The chart 10 according to the second example embodiment is partially different from that in the first example embodiment only in the configuration, and may be the same in the other parts. For this reason, a part that is different from the first example embodiment described above will be described in detail below, and a description of other overlapping parts will be omitted as appropriate.

(Configuration of Chart)

First, with reference to FIG. 3, a configuration of the chart according to the second example embodiment will be described. FIG. 3 is a plan view illustrating the configuration of the chart according to the second example embodiment. In FIG. 3, the same components as those illustrated in FIG. 1 carry the same reference numerals.

Figure 3:
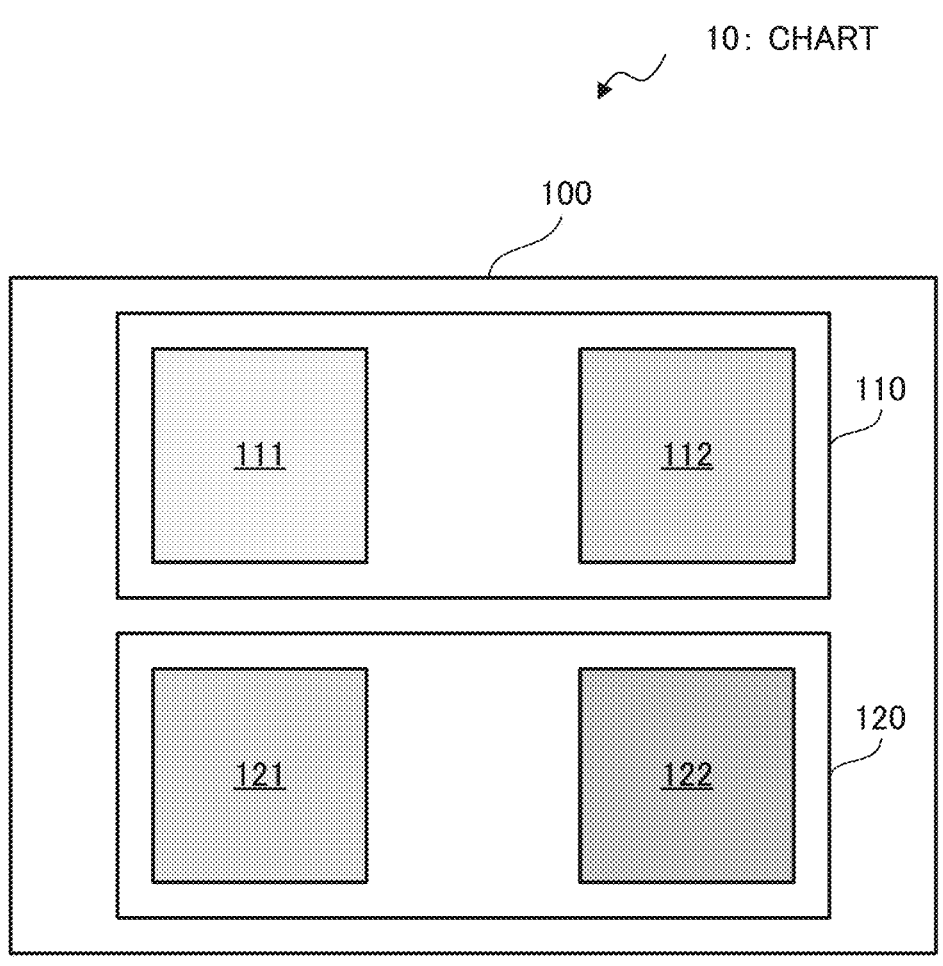
FIG. 3 is a plan view illustrating a configuration of a chart according to a second example embodiment.

As illustrated in FIG. 3, the chart 10 according to the second example embodiment includes the substrate 100, the first skin reflection patch part 110 that is formed on the substrate 100, and the second skin reflection patch part 120. Especially in the second example embodiment, the first skin reflection patch part 110 includes a first patch part 111 and a second patch part 112. The second skin reflection patch part 120 includes a third patch part 121 and a fourth patch part 122.

The first patch part 111 in the first skin reflection patch part 110 is configured to simulate the reflection when the wavelength of the near-infrared rays is the first wavelength. On the other hand, the second patch part 112 in the first skin reflection patch part 110 is configured to simulate the reflection when the wavelength of the near-infrared rays is the second wavelength. That is, the first patch part 111 and the second patch part 112 are configured to correspond to near-infrared rays of different wavelengths, respectively.

The third patch part 121 in the second skin reflection patch part 120 is configured to simulate the reflection when the wavelength of the near-infrared rays is the first wavelength. That is, the third patch part 121 is provided to correspond to the same wavelength as that of the near-infrared ray's corresponding to the first patch part 111 in the first skin reflection patch part 110. On the other hand, the fourth patch part 122 in the second skin reflection patch part 120 is configured to simulate the reflection when the wavelength of the near-infrared rays is the second wavelength. That is, the fourth patch part 122 is provided to correspond to the same wavelength as that of the near-infrared rays corresponding to the second patch part 112 in the first skin reflection patch part 110.

(Method of Setting Reflectance)

Next, with reference to FIG. 4, a method of setting the reflectance of the chart 10 according to the second example embodiment will be described. FIG. 4 is a graph illustrating the method of setting the reflectance of the chart according to the second example embodiment.

Figure 4:
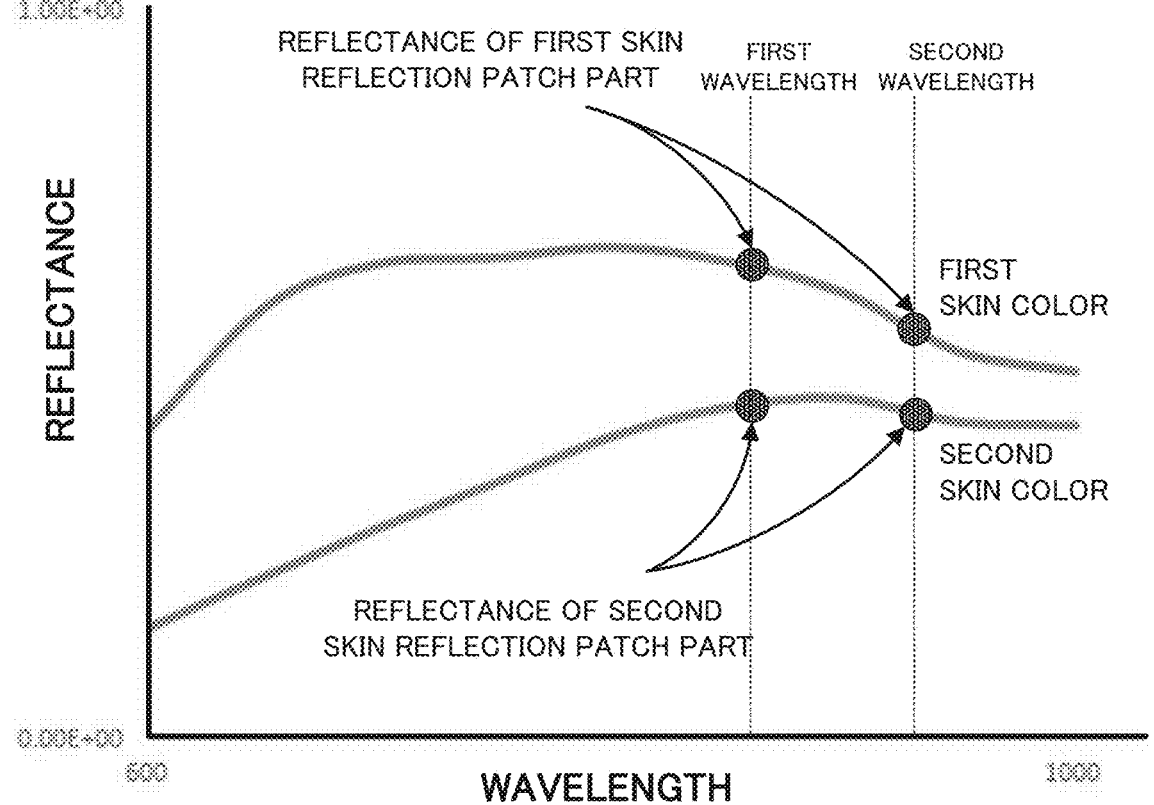
FIG. 4 is a graph illustrating a method of setting the reflectance of the chart according to the second example embodiment.

As illustrated in FIG. 4, the reflectance of the chart 10 according to the second example embodiment (i.e., the reflectance of the first skin reflection patch part 110 and the second skin reflection patch part 120) may be set on the basis of the spectral reflectance of skins of living bodies of different colors (brightness), as in the first example embodiment. Specifically, the first patch part 111 may be set on the basis of the reflectance of the near-infrared rays of the first wavelength, in the skin of the living body of the first skin color, and the second patch part 112 may be set on the basis of the reflectance of the near-infrared rays of the second wavelength, in the skin of the living body of the first skin color. Furthermore, the third patch part 121 may be set on the basis of the reflectance of the near-infrared rays of the first wavelength, in the skin of the living body of the second skin color, and the fourth patch part 122 may be set on the basis of the reflectance of the near-infrared rays of the second wavelength in the skin of living body of the second skin color. Described here is an example in which two patch parts corresponding to two types of wavelengths that are the first wavelength and the second wavelength are set, three or more patch parts corresponding to three or more wavelengths may be set.

(Technical Effect)

Next, a technical effect obtained by the chart 10 according to the second example embodiment will be described.

As described in FIG. 3 and FIG. 4, the chart 10 according to the second example embodiment includes the patch parts corresponding to the first wavelength (i.e., the first patch part 111 and the third patch part 121) and the patch parts corresponding to the second wavelength (i.e., the second patch part 112 and the fourth patch part 122). By using such a chart 10, it is possible to properly determine whether or not a current imaging environment is suitable for biometric authentication when the biometric authentication is performed by using near-infrared rays of different wavelengths.

Third Example Embodiment

The chart 10 according to a third example embodiment will be described with reference to FIG. 5. The chart 10 according to the third example embodiment is partially different from those in the first and second example embodiments only in the configuration, and may be the same in the other parts. For this reason, a part that is different from each of the example embodiments described above will be described in detail below, and a description of other overlapping parts will be omitted as appropriate.

(Method of Setting Reflectance)

First, with reference to FIG. 5, a method of setting the reflectance of the chart 10 according to the third example embodiment will be described. FIG. 5 is a graph illustrating the method of setting the reflectance of the chart according to the third example embodiment.

Figure 5:
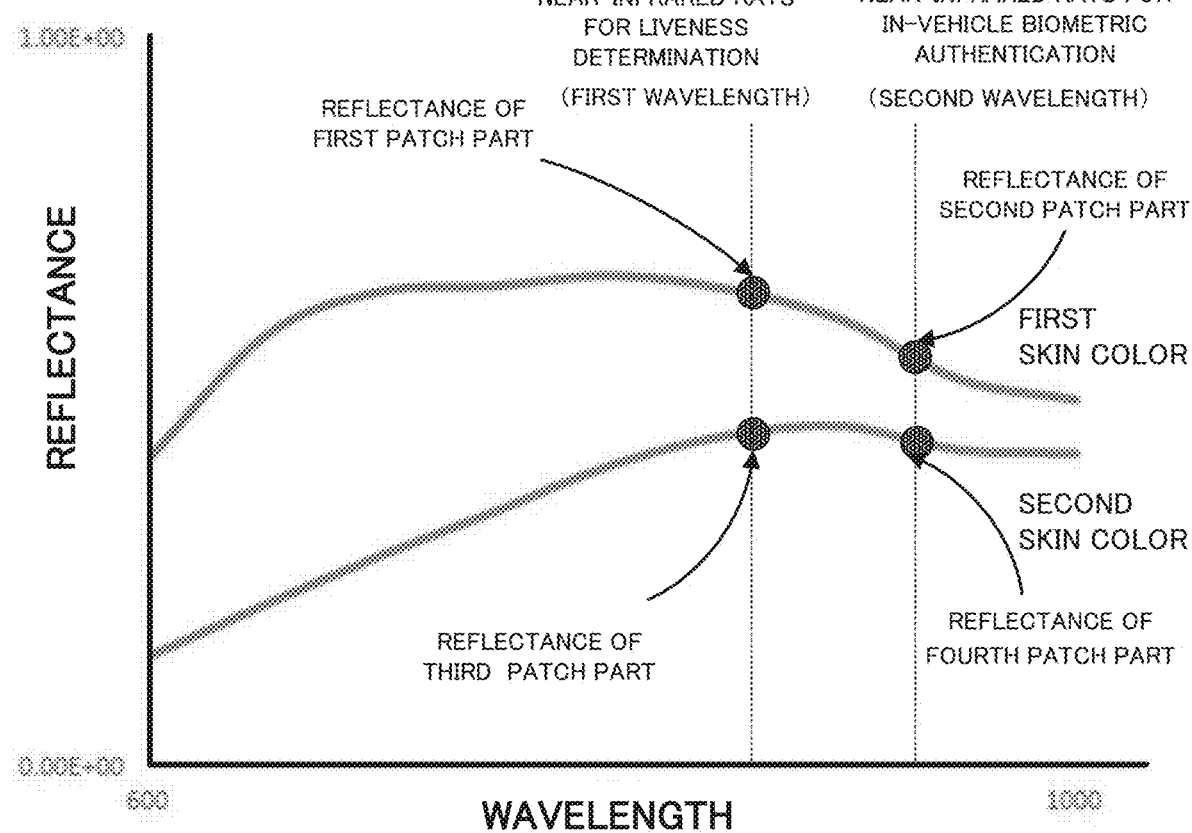
FIG. 5 is a graph illustrating a method of setting the reflectance of a chart according to a third example embodiment.

As illustrated in FIG. 5, the reflectance of the first skin reflection patch part 110 and the second skin reflection patch part 120 in the chart 10 according to the third example embodiment may be set to correspond to the near-infrared rays used in different types of biometric authentication. Specifically, the reflectance of the first patch part 111 in the first skin reflection patch part 110 and the third patch part 121 in the second skin reflection patch part may be set to correspond to a wavelength (e.g., 850 nm) of the near-infrared ray used in liveness determination. Then, the reflectance of the second patch part 112 in the first skin reflection patch part 110 and the fourth patch part 122 in the second skin reflection patch part 120 may be set to correspond to a wavelength (e.g., 940 nm) of the near-infrared rays used in in-vehicle biometric authentication.

The above-described in-vehicle biometric authentication and liveness determination are merely an example, and the reflectance of the first skin reflecting patch part 110 and the second skin reflecting patch part 120 may be set in accordance with another biometric authentication.

(Technical Effect)

Next, a technical effect obtained by the chart 10 according to the third example embodiment will be described.

As described in FIG. 5, the chart 10 according to the third example embodiment includes the first patch part 111 and the third patch part 121, and the second patch part 112 and the fourth patch part 122, such that they correspond to the near-infrared rays used in different types of biometric authentication. By using such a chart 10, it is possible to determine an imaging environment related to different biometric authentication, only with one common chart 10. Therefore, there is no need to prepare separate charts depending on the types of biometric authentication.

Fourth Example Embodiment

The chart 10 according to a fourth example embodiment will be described with reference to FIG. 6. The chart 10 according to the fourth example embodiment is partially different from those in the first to third example embodiments only in the configuration, and may be the same in the other parts. For this reason, a part that is different from each of the example embodiments described above will be described in detail below, and a description of other overlapping parts will be omitted as appropriate.

(Configuration of Chart)

First, with reference to FIG. 6, a configuration of the chart according to the fourth example embodiment will be described. FIG. 6 is a plan view illustrating the configuration of the chart according to the fourth example embodiment. In FIG. 6, the same components as those illustrated in FIG. 3 carry the same reference numerals.

Figure 6:
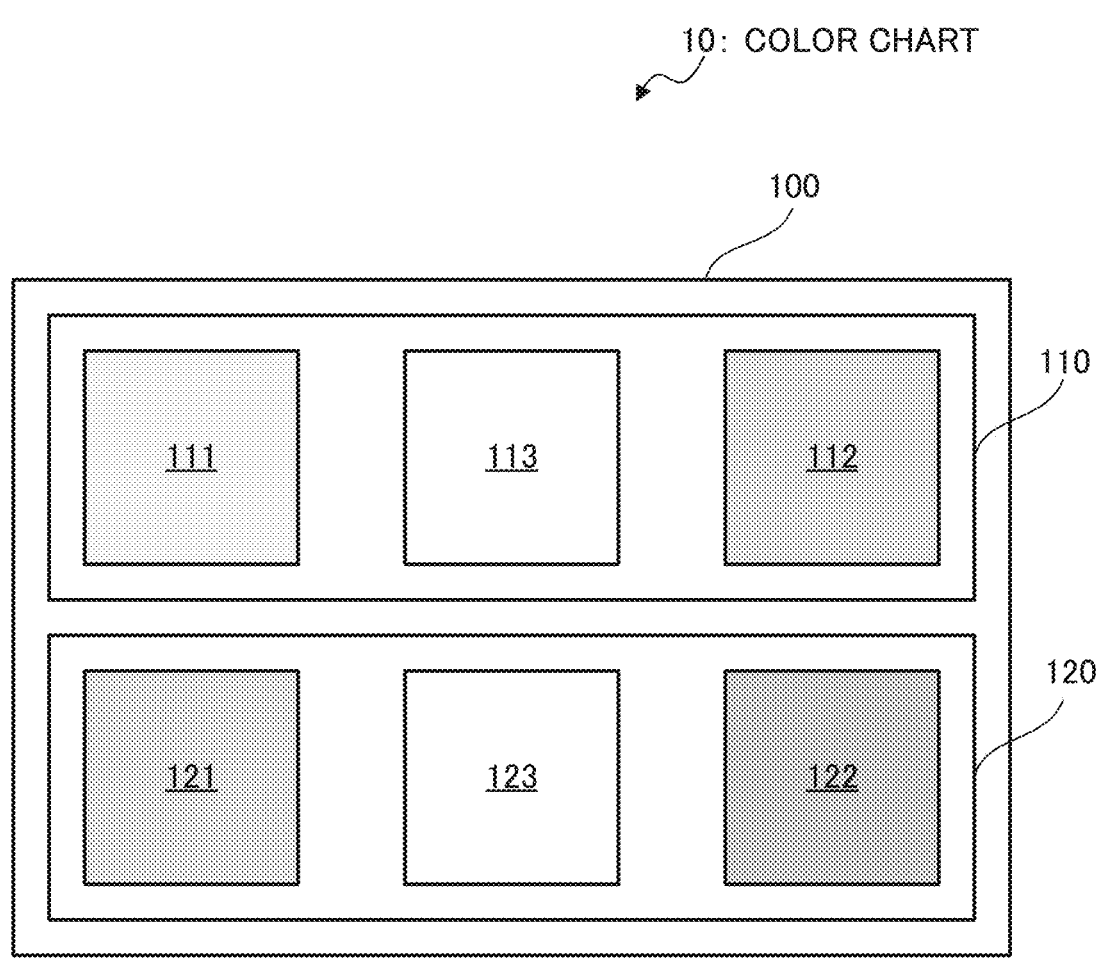
FIG. 6 is a plan view illustrating a configuration of a chart according to a fourth example embodiment.

As illustrated in FIG. 6, the chart 10 according to the fourth example embodiment includes the substrate 100, the first skin reflection patch part 110 that is formed on the substrate 100, and the second skin reflection patch part 120. In particular, the first skin reflection patch part 110 according to the fourth example embodiment further includes a first white color display part 113, in addition to the first patch part 111 and the second patch part 112. In addition, the second skin reflection patch part 120 further includes a second white color display part 123, in addition to the third patch part 121 and the fourth patch part 122.

Each of the first white color display part 113 and the second white color display part 123 is configured to display a standard white color that is a reference color for determining the reflectance of the near-infrared rays. Each of the first white color display part 113 and the second white color display part 123 may be configured by applying white ink on the substrate 100, for example.

The above example describes such a configuration that the first skin reflection patch part 110 includes the first white color display part 113 and the second skin reflection patch part 120 includes the second white color display part 123, but only one of the first white color display part 113 and the second white color display part 123 may be provided. That is, the first skin reflection patch part 110 may include the first white color display part 113, whereas the second skin reflection patch part 120 may not include the second white color display part 123. Conversely, the first skin reflection patch part 110 may not include the first white color display part 113, whereas the second skin reflection patch part 120 may include the second white color display part 123.

(Technical Effect)

Next, a technical effect obtained by the chart 10 according to the fourth example embodiment will be described.

As described in FIG. 6, the chart 10 according to the fourth example embodiment includes the first white color display part 113 and the second white color display part 123. By using such a chart 10, a reference value for determining the imaging environment may be known from an image/appearance condition of the first white color display part 113 and the second white color display part 123, and it is thus possible to more properly determine whether or not the current imaging environment is suitable for biometric authentication.

Fifth Example Embodiment

The chart 10 according to a fifth example embodiment will be described with reference to FIG. 7. The chart 10 according to the fifth example embodiment is partially different from those in the first to fourth example embodiments only in the configuration, and may be the same in the other parts. For this reason, a part that is different from each of the example embodiments described above will be described in detail below, and a description of other overlapping parts will be omitted as appropriate.

(Configuration of Chart)

First, with reference to FIG. 7, a configuration of the chart according to the fifth example embodiment will be described. FIG. 7 is a plan view illustrating the configuration of the chart according to the fifth example embodiment. In FIG. 7, the same components as those illustrated in FIG. 6 carry the same reference numerals.

Figure 7:
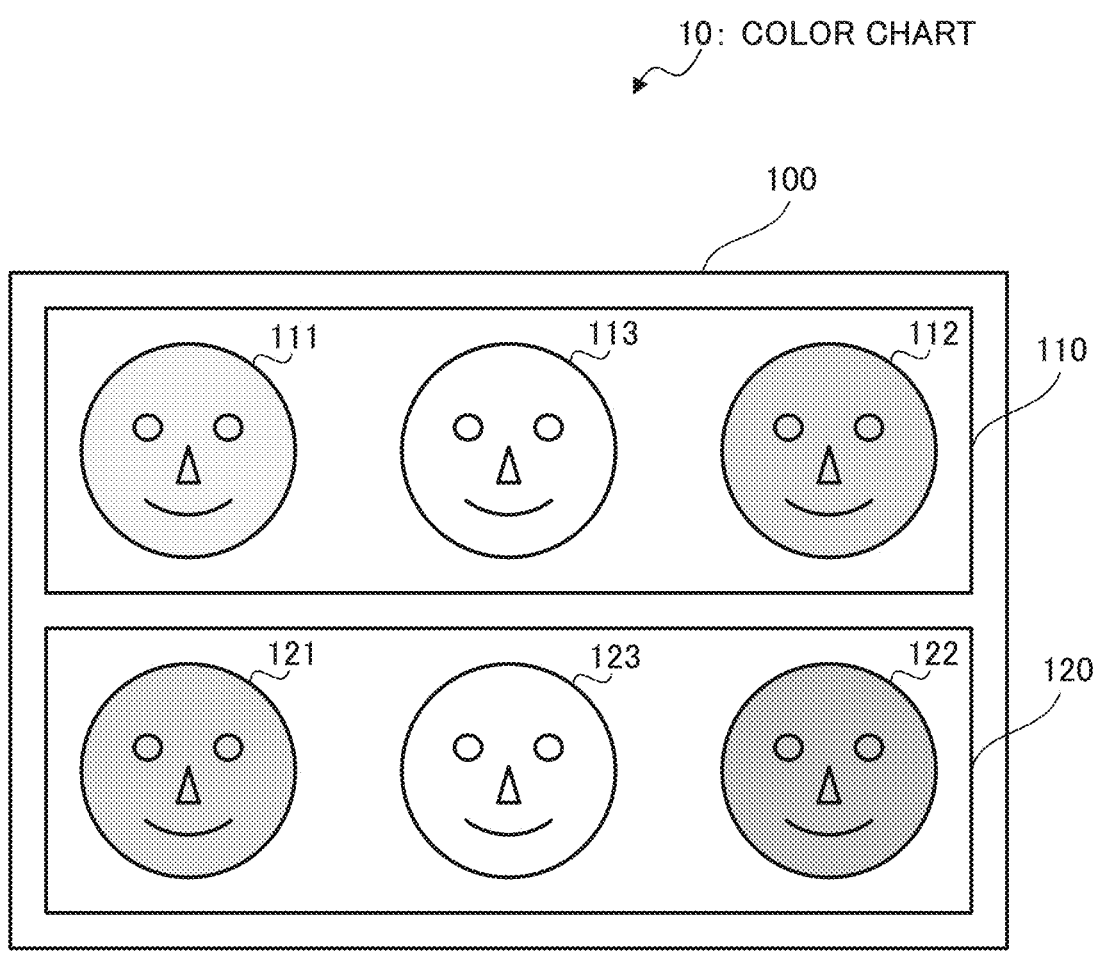
FIG. 7 is a plan view illustrating a configuration of a chart according to a fifth example embodiment.

As illustrated in FIG. 7, the chart 10 according to the fifth example embodiment includes the substrate 100, the first skin reflection patch part 110 that is formed on the substrate 100, and the second skin reflection patch part 120. Then, the first skin reflection patch part 110 and the second skin reflection patch part 120 according to the fourth example embodiment are formed in a three-dimensional shape that simulates a human face. Specifically, each of the first patch part 111, the second patch part 112, the first white color display part 113 in the first skin reflection patch part 110, and the third patch part 121, the fourth patch part 122, and the second white color display part 123 in the second skin reflection patch part 120 is shaped to reproduce unevenness such as eyes, a nose, and a mouth, in a face of the living body. The three-dimensional shapes of the first skin reflection patch part 110 and the second skin reflection patch part 120 may be common to each other, or may be different shapes.

In the above example, all of the first patch part 111, the second patch part 112, the first white color display part 113, the third patch part 121, the fourth patch part 122, and the second white color display part 123 are formed to be in the three-dimensional shape, but only a part of them may be in the three-dimensional shape. That is, the three-dimensional shape and a planar shape may be mixed.

(Technical Effect)

Next, a technical effect obtained by the chart 10 according to the fifth example embodiment will be described.

As described in FIG. 7, in the chart 10 according to the fifth example embodiment, each of the first skin reflection patch part 110 and the second skin reflection patch part 120 is formed to have the three-dimensional shape that simulates a human face. By using such a chart 10, the reflection of the near-infrared rays in the face of the living body may be simulated more correctly, and it is thus possible to more properly determine whether or not the current imaging environment is suitable for biometric authentication.

Sixth Example Embodiment

The chart 10 according to a sixth example embodiment will be described with reference to FIG. 8 and FIG. 9. The chart 10 according to the sixth example embodiment is partially different from those in the first to fifth example embodiments only in the configuration, and may be the same in the other parts. For this reason, a part that is different from each of the example embodiments described above will be described in detail below, and a description of other overlapping parts will be omitted as appropriate.

(Configuration of Chart)

First, a configuration of the chart according to the sixth example embodiment will be described with reference to FIG. 8. FIG. 8 is a plan view illustrating the configuration of the chart according to the sixth example embodiment. In FIG. 8, the same components as those illustrated in FIG. 1 carry the same reference numerals.

Figure 8:
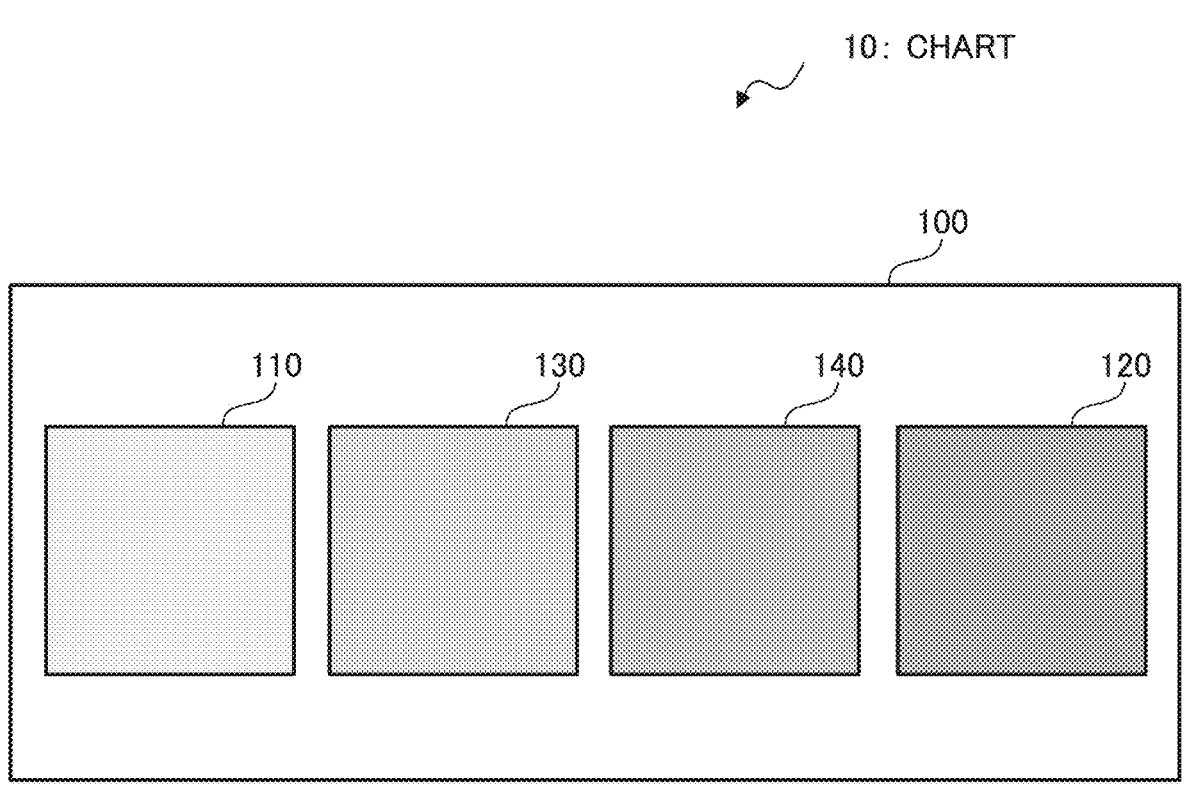
FIG. 8 is a plan view illustrating a configuration of a chart according to a sixth example embodiment.

As illustrated in FIG. 8, the chart 10 according to the sixth example embodiment includes the substrate 100, the first skin reflection patch part 110 that is formed on the substrate 100, the second skin reflection patch part 120, a third skin reflection patch part 130, and a fourth skin reflection patch part 140. That is, the chart 10 according to the sixth example embodiment further includes the third skin reflection patch part 130 and the fourth skin reflection patch part 140, in addition to the configuration in the first example embodiment (see FIG. 1).

Each of the third skin reflection patch part 130 and the fourth skin reflection patch part 140 is configured to correspond to a skin color that is different from the first skin color corresponding to the first skin reflection patch part 110 and the second skin color corresponding to the second skin reflection patch part 120. Specifically, the third skin reflection patch part 130 is configured to simulate the reflection in the skin of the living body of a third skin color. The fourth skin reflection patch part 140 is configured to simulate the reflection in the skin of the living body of a fourth skin color. Each of the third skin color and the fourth skin color may be an intermediate color of the first skin color and the second skin color.

(Method of Setting Reflectance)

Next, with reference to FIG. 9, a method of setting the reflectance of the chart 10 according to the sixth example embodiment will be described. FIG. 9 is a graph illustrating the method of setting the reflectance of the chart according to the sixth example embodiment.

Figure 9:
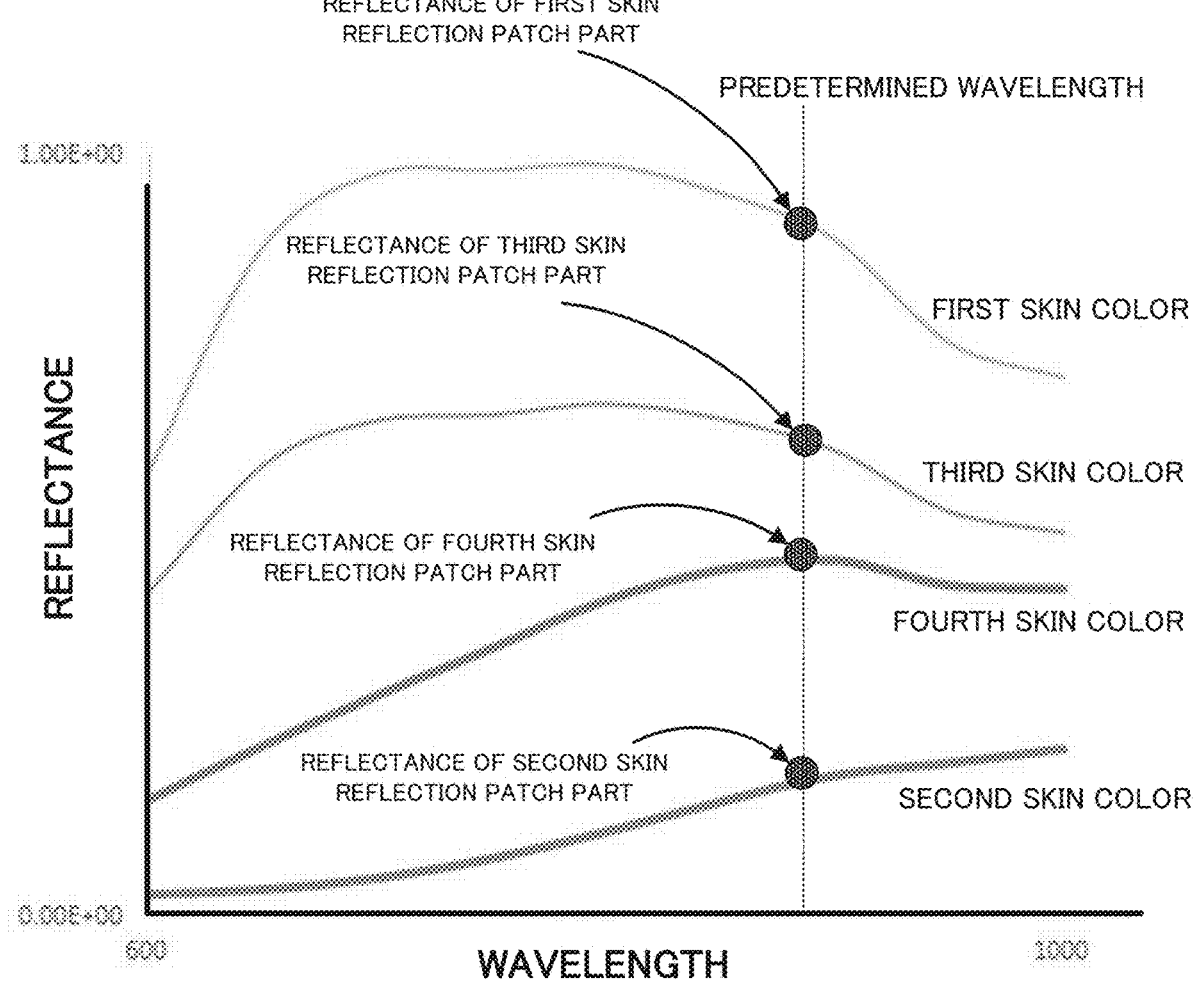
FIG. 9 is a graph illustrating a method of setting the reflectance of the chart according to the sixth example embodiment.

As illustrated in FIG. 9, the first skin reflection patch part 110, the second skin reflection patch part 120, the third skin reflection patch part 130, and the fourth skin reflection patch part 140 in the chart 10 according to the sixth example embodiment are set on the basis of the spectral reflectance of the skins of living bodies of different colors (brightness). Specifically, the reflectance of the first skin reflection patch part 110 is set on the basis of the reflectance of the near-infrared rays of the predetermined wavelength, in the skin of the living body of the first skin color (a relatively bright color). The reflectance of the second skin reflection patch part 120 is set on the basis of the reflectance of the near-infrared rays of the predetermined wavelength, in the skin of the living body of the second skin color (a relatively dark color). The reflectance of the third skin reflection patch part 130 is set on the basis of the reflectance of the near-infrared rays of the predetermined wavelength, in the skin of the living body of the third skin color (a color slightly darker than the first skin color). The reflectance of the fourth skin reflection patch part 140 is set on the basis of the reflectance of the near-infrared rays of the predetermined wavelength, in the skin of the living body of the fourth skin color (a color slightly brighter than the second skin color).

(Technical Effect)

Next, a technical effect obtained by the chart 10 according to the sixth example embodiment will be described.

As described in FIG. 8 and FIG. 9, the chart 10 according to the sixth example embodiment includes the patch parts corresponding to the third skin color and the fourth skin color, in addition to the patch parts corresponding to the first skin color and the second skin color. By using such a chart 10, it is possible to determine what extent of the skin color the imaging environment is suitable for. For example, if the second reflection patch part 120 and the fourth skin reflection patch part 140 are not properly imaged, even though the first skin reflection patch part 110 and the third skin reflection patch part 130 are properly imaged, then, it is possible to determine that it is not in an environment in which the biometric authentication is properly performed on targets of the second skin color and the fourth skin color, even though it is in an environment in which the biometric authentication is properly performed on targets of the first skin color and the third skin color.

Seventh Example Embodiment

A method of manufacturing the chart 10 according to the seventh example embodiment will be described with reference to FIG. 10. The seventh example embodiment describes the method of manufacturing the chart 10 according to the first to sixth example embodiments.
(Manufacturing Process)

First, each process of the method of manufacturing the chart 10 according to the seventh example embodiment will be described with reference to FIG. 10. FIG. 10 is a flowchart illustrating the method of manufacturing the chart according to the seventh example embodiment.

Figure 10:
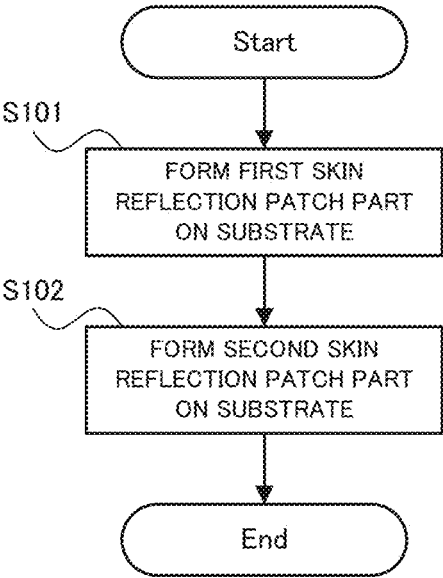
FIG. 10 is a flowchart illustrating a method of manufacturing a chart according to a seventh example embodiment.

As illustrated in FIG. 10, in the method of manufacturing the chart 10 according to the seventh example embodiment, first, the first skin reflection patch part 110 is formed on the substrate 100 (step S101). The first skin reflection patch part 110 is formed as the member that simulates the reflection of the near-infrared rays of the predetermined wavelength, in the skin of the living body of the first skin color, as already described. The first skin reflection patch part 110 may be formed by applying gray ink on the substrate 100, for example.

Subsequently, the second skin reflection patch part 120 is formed on the substrate 100 (step S102). The second skin reflection patch part 120 is formed as the member that simulates the reflection of the near-infrared rays of the predetermined wavelength, in the skin of the living body of the second skin color, as already described. The second skin reflection patch part 120 may be formed by applying gray ink on the substrate 100, for example.

The steps S101 and S102 may be performed one after the other. That is, the first skin reflection patch part 110 may be formed after the second skin reflection patch part 120 is formed. The steps S101 and S102 may also be performed simultaneously in parallel. That is, the first skin reflection patch part 110 and the second skin reflection patch part 120 may be formed simultaneously.
(Technical Effect)

Next, a technical effect obtained by the chart 10 according to the seventh example embodiment will be described.

As described in FIG. 10, according to the method of manufacturing the chart 10 according to the seventh example embodiment, it is possible to properly manufacture the chart 10 (i.e., the chart 10 described in the first to fifth example embodiments) including the first skin reflection patch part 110 corresponding to the first skin color and the second skin reflection patch part 120 corresponding to the second skin color.

Eighth Example Embodiment

A determination system according to an eighth example embodiment will be described with reference to FIG. 11 to FIG. 13. The determination system according to the eighth example embodiment uses the chart 10 described in the first to sixth example embodiments.
(Hardware Configuration)

First, a hardware configuration of a determination system 20 according to the eighth example embodiment will be described with reference to FIG. 11. FIG. 11 is a block diagram illustrating the hardware configuration of the determination system according to the eighth example embodiment.

Figure 11:
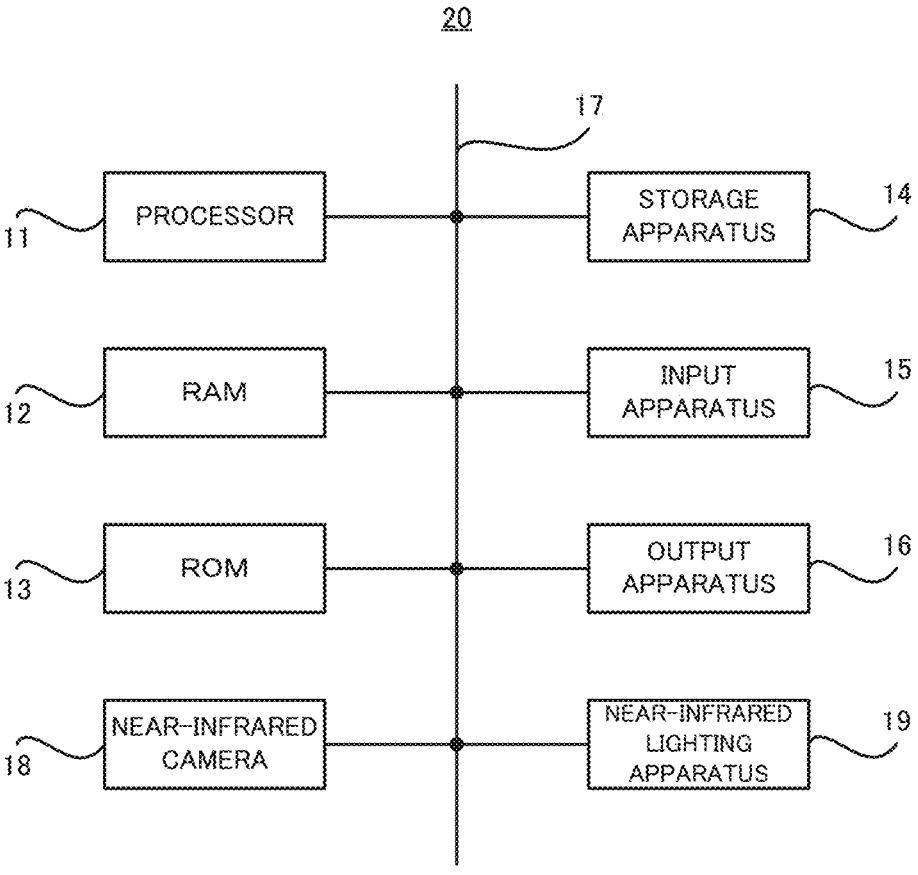
FIG. 11 is a block diagram illustrating a hardware configuration of a determination system according to an eighth example embodiment.

As illustrated in FIG. 11, the determination system 20 according to the eighth example embodiment includes a processor 11, a RAM (Random Access Memory) 12, a ROM (Read Only Memory) 13, and a storage apparatus 14. The determination system 20 may further include an input apparatus 15, an output apparatus 16, a near-infrared camera 18, and a near-infrared lighting apparatus 19. The processor 11, the RAM 12, the ROM 13, the storage apparatus 14, the input apparatus 15, the output apparatus 16, the near-infrared camera 18 and the near-infrared lighting apparatus 19 are connected through a data bus 17.

The processor 11 reads a computer program. For example, the processor 11 is configured to read a computer program stored by at least one of the RAM 12, the ROM 13, and the storage apparatus 14. Alternatively, the processor 11 may read a computer program stored in a computer-readable recording medium by using a not-illustrated recording medium reading apparatus. The processor 11 may obtain (i.e., may read) a computer program from a not-illustrated apparatus disposed outside the determination system 20, through a network interface. The processor 11 controls the RAM 12, the storage apparatus 14, the input apparatus 15, and the output apparatus 16 by executing the read computer program. Especially in this example embodiment, when the processor 11 executes the read computer program, a functional block for determining the imaging environment of an image is realized or implemented in the processor 11.

The processor 11 may be configured as, for example, a CPU (Central Processing Unit), a GPU (Graphics Processing Unit), a FPGA (field-programmable gate array), a DSP (Demand-Side Platform) or an ASIC (Application Specific Integrated Circuit). The processor 11 may be include one of them, or may use a plurality of them in parallel.

The RAM 12 temporarily stores the computer program to be executed by the processor 11. The RAM 12 temporarily stores the data that are temporarily used by the processor 11 when the processor 11 executes the computer program. The RAM 12 may be, for example, a D-RAM (Dynamic RAM).

The ROM 13 stores the computer program to be executed by the processor 11. The ROM 13 may otherwise store fixed data. The ROM 13 may be, for example, a P-ROM (Programmable ROM).

The storage apparatus 14 stores the data that are stored for a long term by the determination system 20. The storage apparatus 14 may operate as a temporary storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the determination system 20. The input apparatus 15 may include, for example, at least one of a keyboard, a mouse, and a touch panel.

The output apparatus 16 is an apparatus that outputs information about the determination system 20 to the outside. For example, the output apparatus 16 may be a display apparatus (e.g., a display) that is configured to display the information about the determination system 20.

The near-infrared camera 18 is configured to capture a near-infrared image. The near-infrared camera 18 may be configured to capture a near-infrared image (specifically, an image used for biometric authentication) including the face of the living body, for example. Furthermore, the near-infrared camera 18 according to this example embodiment is especially configured to image the chart 10 described in the first to fifth example embodiments.

The near-infrared lighting apparatus 19 is configured to apply near-infrared rays to a subject. The near-infrared lighting apparatus 19 may be configured to apply the near-infrared rays of the predetermined wavelength (e.g., the first wavelength or the second wavelength) on the subject. The near-infrared lighting apparatus 19 is disposed to apply the near-infrared rays on the chart 10 when an image of the chart 10 is captured by the near-infrared camera 18. The near-infrared lighting apparatus 19 may be configured to adjust a lighting direction and intensity of the near-infrared rays to be applied (specifically, a parameter that influences the light environment in the imaging).

(Functional Configuration)

Next, a functional configuration of the determination system 20 according to the eighth example embodiment will be described with reference to FIG. 12. FIG. 12 is a block diagram illustrating the functional configuration of the determination system according to the eighth example embodiment.

Figure 12:
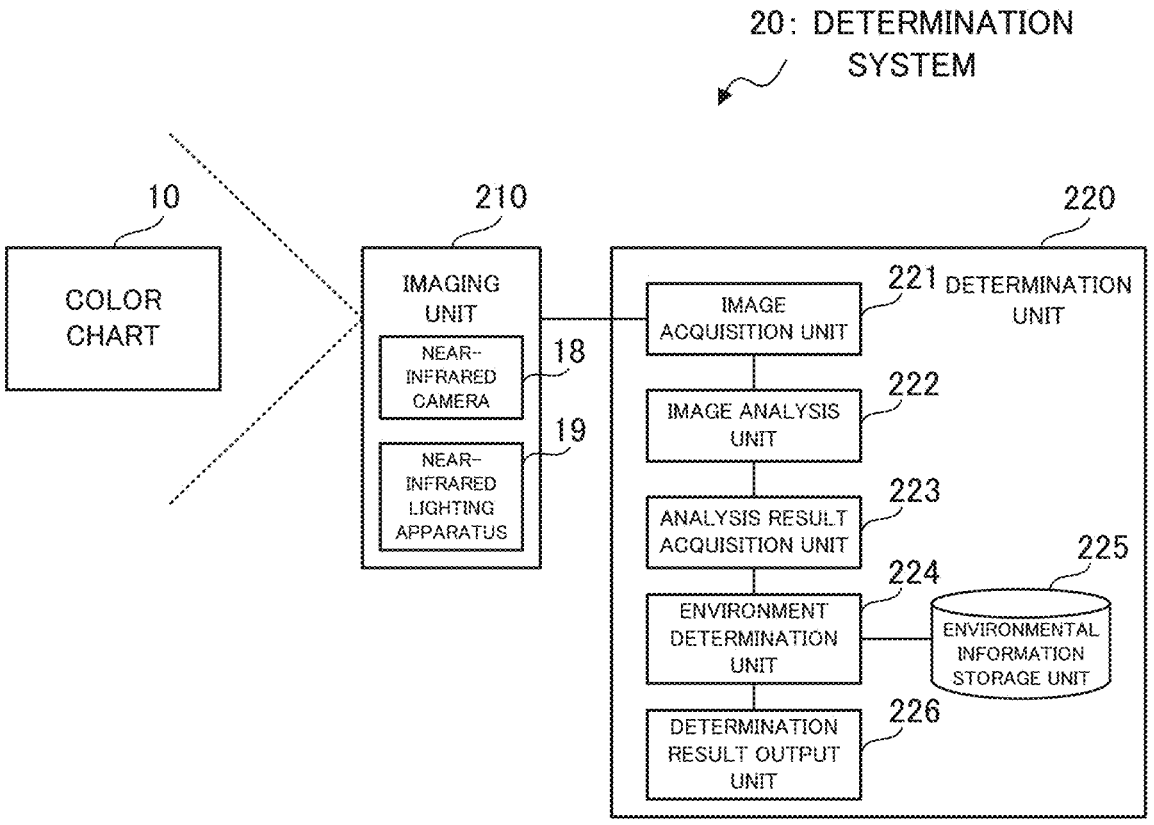
FIG. 12 is a block diagram illustrating a functional configuration of the determination system according to the eighth example embodiment.

As illustrated in FIG. 12, the determination system 20 according to the eighth example embodiment includes, as processing blocks for realizing the functions thereof, an imaging unit 210 and a determination unit 220.

The imaging unit 210 includes the near-infrared camera 18 and the near-infrared lighting apparatus 19 described above (see FIG. 9). The imaging unit 210 is configured to capture an image of the chart 10. The image of the chart 10 captured by the imaging unit 210 is configured to be outputted to the determination unit 220.

The determination unit 220 is configured to determine whether or not the light environment when an image is captured (hereinafter referred to as an "imaging environment" as appropriate) is suitable for biometric authentication, by using the image of the chart 10 captured by the imaging unit 210. The determination unit 220 includes an image acquisition unit 221, an image analysis unit 222, an analysis result acquisition unit 223, an environment determination unit 224, an environmental information storage unit 225, and a determination result output unit 226. Each of the image acquisition unit 221, the image analysis unit 222, the analysis result acquisition unit 223, and the environment determination unit 224 may be realized or implemented by the processor 11 (see FIG. 9), for example. The environmental information storage unit 225 may be realized or implemented by the storage apparatus 14 (see FIG. 9), for example. The determination result output unit 226 may be realized or implemented by the output apparatus 16 (see FIG. 9), for example.

The image acquisition unit 221 is configured to obtain the image of the chart 10 captured by the imaging unit 210. The image of the chart 10 obtained by the image acquisition unit 221 is configured to be outputted to the image analysis unit 222.

The image analysis unit 222 is configured to perform an analysis process on the chart 10 obtained by the image acquisition unit 221. This analysis process is to obtain information for determining the imaging environment from the image of the chart 10. For example, the image analysis unit 222 may be configured to detect luminance of each of pixels of the image of the chart 10 (specifically, luminance of areas corresponding to the first skin reflection patch part 110 and the second skin reflection patch part 120) by the analysis process.

The analysis result acquisition unit 223 is configured to obtain an analysis result (e.g., the luminance) of the image analysis unit 222. The analysis result obtained by the analysis result acquisition unit 223 is configured to be outputted to the environmental determination unit 224.

The environment determination unit 224 is configured to determine whether or not the imaging environment is an environment suitable for biometric authentication, on the basis of the analysis result obtained by the analysis result acquisition unit 223. More specifically, the environment determination unit 224 compares the analysis result obtained by the analysis result acquisition unit 223 with information stored in the environmental information storage unit 225, thereby to determine whether or not the imaging environment is an environment suitable for biometric authentication.

The environmental information storage unit 225 is configured to store information (specifically, a threshold) for determining whether or not the imaging environment is an environment suitable for biometric authentication. The environmental information storage unit 225 may store a threshold (an upper limit value and a lower limit value) indicating that the luminance as the analysis result is appropriate, for example. In this instance, the environment determination unit 224 determines whether or not the imaging environment is an environment suitable for biometric authentication, in accordance with whether or not the analysis result (a luminance value of the image) obtained by the analysis result acquisition unit 223 is in a range of the stored threshold. The environmental information storage unit 225 may separately store a threshold corresponding to the first skin reflection patch unit 110 and a threshold corresponding to the second skin reflection patch unit 120. Furthermore, when the first skin reflection patch unit 110 includes the first patch part 111 and the second patch part 112 and the second skin reflection patch unit 120 includes the third patch part 121 and the fourth patch part 122, the environmental information storage unit 225 may separately store a threshold corresponding to each of the patch parts.

The determination result output unit 226 is configured to output a determination result of the environment determination unit 224 (i.e., a result of the determination of whether or not the imaging environment is an environment suitable for biometric authentication). The determination result output unit 226 may output the determination result as an image, or may output it as audio. The determination result output unit 226 may output various types of information used for the determination (e.g., the luminance value as the analysis result, etc.), in addition to the determination result. The determination result output unit 226 may also output a method for improving the imaging environment, when it is determined that the imaging environment is not an environment suitable for biometric authentication. For example, the determination result output unit 226 may output a message prompting the adjustment of the direction and intensity of the near-infrared rays.

(Flow of Operation)

Next, with reference to FIG. 13, a flow of operation of the determination system 20 according to the eighth example embodiment will be described. FIG. 13 is a flowchart illustrating the flow of the operation of the determination system according to the eighth example embodiment.

Figure 13:
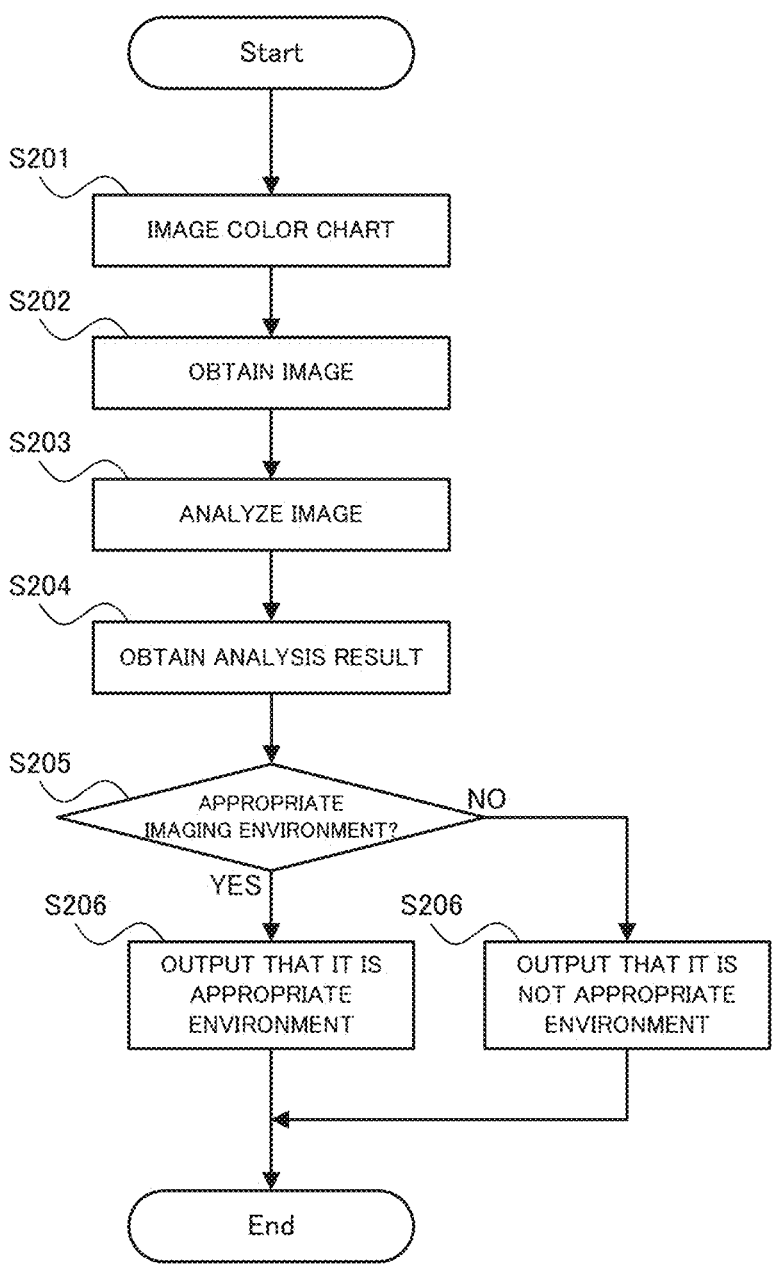
FIG. 13 is a flowchart illustrating a flow of operation of the determination system according to the eighth example embodiment.

As illustrated in FIG. 13, in operation of the determination system 20 according to the eighth example embodiment, first, the imaging unit 210 captures the image of the chart 10 (step S201). When the chart 10 is imaged, the chart 10 may be carried by a person and moved into an imaging range, or the chart 10 may be disposed in the imaging range.

Subsequently, the image acquisition unit 221 obtains the image of the chart 10 captured by the imaging unit 210 (step S202). Then, the image analysis unit 222 analyzes the image of the chart 10 obtained by the image acquisition unit 221 (step S203).

Subsequently, the analysis result acquisition unit 223 obtains the analysis result of the image analysis unit 222 (step S204). Then, the environment determination unit 224 determines whether or not the current imaging environment is suitable for biometric authentication, on the basis of the analysis result obtained by the analysis result acquisition unit 223 and the information read from the environmental information storage unit 225 (step S205).

When it is determined that the imaging environment is suitable for biometric authentication (step S205: YES), the determination result output unit 226 outputs information indicating that it is an appropriate environment (step S206). On the other hand, when it is determined that the imaging environment is not suitable for biometric authentication (step S205: NO), the determination result output unit 226 outputs information indicating that it is not an appropriate environment (step S206).

(Technical Effect)

Next, a technical effect obtained by the determination system 20 according to the eighth example embodiment will be described.

As described in FIG. 11 to FIG. 13, in the determination system 20 according to the eighth example embodiment, it is determined whether or not the imaging environment is suitable for biometric authentication, on the basis of the image of the chart 10. In this way, it is possible to more properly recognize the imaging environment related to the near-infrared rays that are hardly recognized visually. It is therefore possible to perform the biometric authentication in an appropriate environment.

Ninth Example Embodiment

The determination system 20 according to a ninth example embodiment will be described with reference to FIG. 14 and FIG. 15. The ninth example embodiment shows an example of a method of imaging the chart 10 in the eighth example embodiment, and may be the same as the eighth example embodiment in the configuration and operation of the system. For this reason, a part that is different from the eighth example embodiment described above will be described in detail below, and a description of other overlapping parts will be omitted as appropriate.

(Simultaneous Imaging of a Plurality of Charts)

First, with reference to FIG. 14, a first imaging method of the determination system 20 according to the ninth example embodiment will be described. FIG. 14 is version 1 of a plan view illustrating an example of the method of imaging the chart in the determination system according to the ninth example embodiment.

Figure 14:
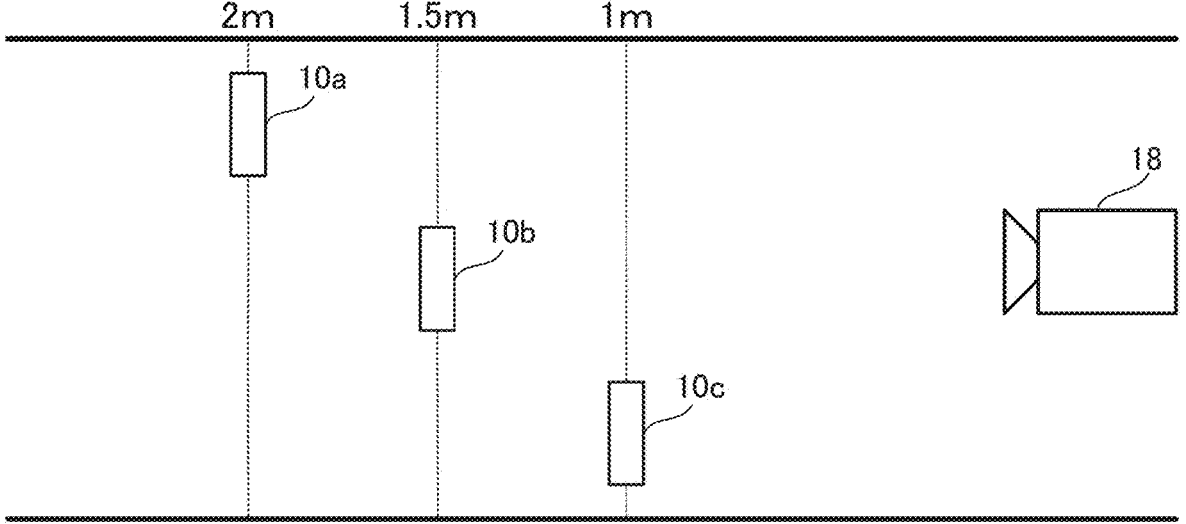
FIG. 14 is version 1 of a plan view illustrating an example of a method of imaging a chart in a determination system according to a ninth example embodiment.

In FIG. 14, the near-infrared camera 18 of the determination system 20 according to the ninth example embodiment is disposed in a passage where a target person of biometric authentication walks at the time of authentication. That is, the near-infrared camera 18 is configured to capture an image used for walk-through authentication. When the chart 10 is imaged by the near-infrared camera 18, a plurality of charts 10 arranged at different distances from the near-infrared camera 18 may be imaged, on the assumption that the target person walks toward the near-infrared camera 18. For example, as illustrated, a chart 10a at a position of 2 m from the near-infrared camera 18, a chart 10b at a position of 1.5 m, and a chart 10c at a position of 1 m may be simultaneously imaged. In this instance, it is preferable that the plurality of charts 10a, 10b, and 10c are arranged not to overlap when viewed from the near-infrared camera 18.

(Moving and Imaging Chart Multiple Times)

Next, with reference to FIG. 15, a second imaging method of the determination system 20 according to the ninth example embodiment will be described. FIG. 15 is version 2 of a plan view illustrating an example of the method of imaging the chart in the determination system according to the ninth example embodiment.

Figure 15:
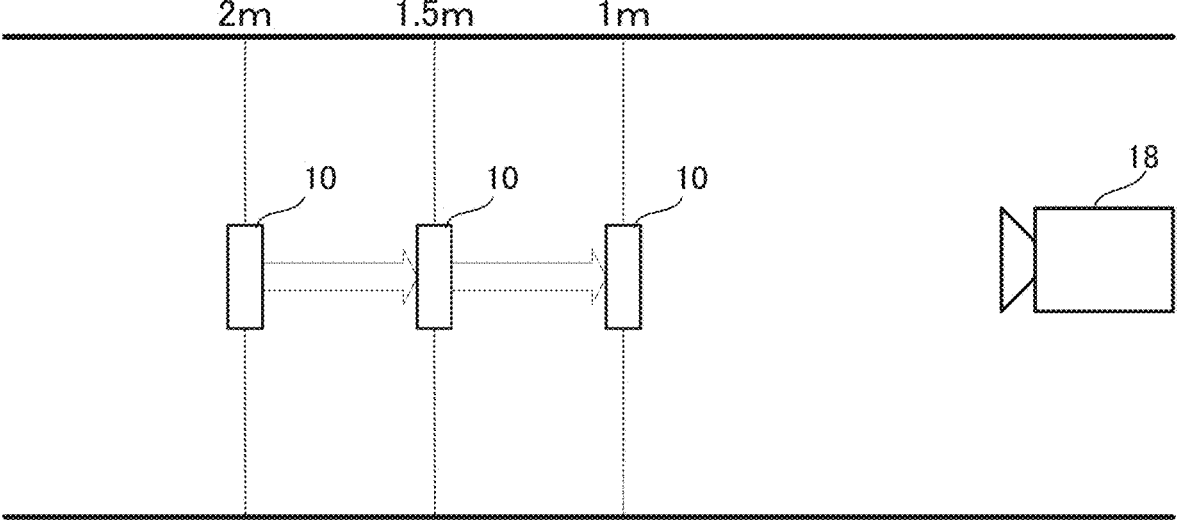
FIG. 15 is version 2 of a plan view illustrating an example of the method of imaging the chart in the determination system according to the ninth example embodiment.

As illustrated in FIG. 15, the near-infrared camera 18 of the determination system 20 according to the ninth example embodiment may perform first imaging by disposing the chart 10 at a position of 2 m from the near-infrared camera 18, then may move the chart 10 at a position of 1.5 m from the near-infrared camera 18 to perform second imaging, and then may move the chart 10 at a position of 1 m from the near-infrared camera 18 to perform third imaging. Even when the chart is moved and imaged multiple times, it is possible to capture the images of the chart 10 at different distances from the near-infrared camera 18, as in the simultaneous imaging illustrated in FIG. 14. The imaging by the near-infrared camera 18 may be performed automatically by using a distance sensor, or may be performed manually. Alternatively, the imaging may be performed automatically a predetermined period after the chart 10 fits within an angle of view of the near-infrared camera 18.

The imaging methods described in FIGS. 14 and 15 are exemplary, and the imaging may be performed by another method as long as it is a method capable of imaging the chart 10 at different distances from the near-infrared camera 18. The imaging of the chart 10 may be ended when there is no difference in an image/appearance condition of the chart 10 at each point. Furthermore, when there is a difference in the image/appearance condition of the chart 10 at each point, the chart 10 may be disposed at another position (e.g., an intermediate position such as 1.75 m and 1.25 m), and a notice of new imaging may be given.

(Technical Effect)

Next, a technical effect obtained by the determination system 20 according to the ninth example embodiment will be described.

As described in FIG. 14 and FIG. 15, in the determination system 20 according to the eighth example embodiment, the images of the chart 10 are captured at different distances from the near-infrared camera 18. In this way, it is possible to determine the imaging environment at each of a plurality of points. The imaging environment may vary even in a slight movement, depending on the position of the near-infrared lighting apparatus 19 or the like, but by determining the imaging environment at a plurality of points as described above, it is possible to capture an appropriate image, regardless of the position of an imaging target. Therefore, even when an image is captured while a target is moving, for example, as in walk-through authentication, it is possible to properly perform the biometric authentication.

Tenth Example Embodiment

The determination system 20 according to a tenth example embodiment will be described with reference to FIG. 16 and FIG. 17. The tenth example embodiment is partially different from the eighth and ninth example embodiments only in the configuration and operation, and may be the same as those of the eighth and ninth example embodiments. For this reason, a part that is different from each of the example embodiments described above will be described in detail below, and a description of other overlapping parts will be omitted as appropriate.

(Functional Configuration)

First, a functional configuration of the determination system 20 according to the tenth example embodiment will be described with reference to FIG. 16. FIG. 16 is a block diagram illustrating the functional configuration of the determination system according to the tenth example embodiment. In FIG. 16, the same components as those illustrated in FIG. 12 carry the same reference numerals.

Figure 16:
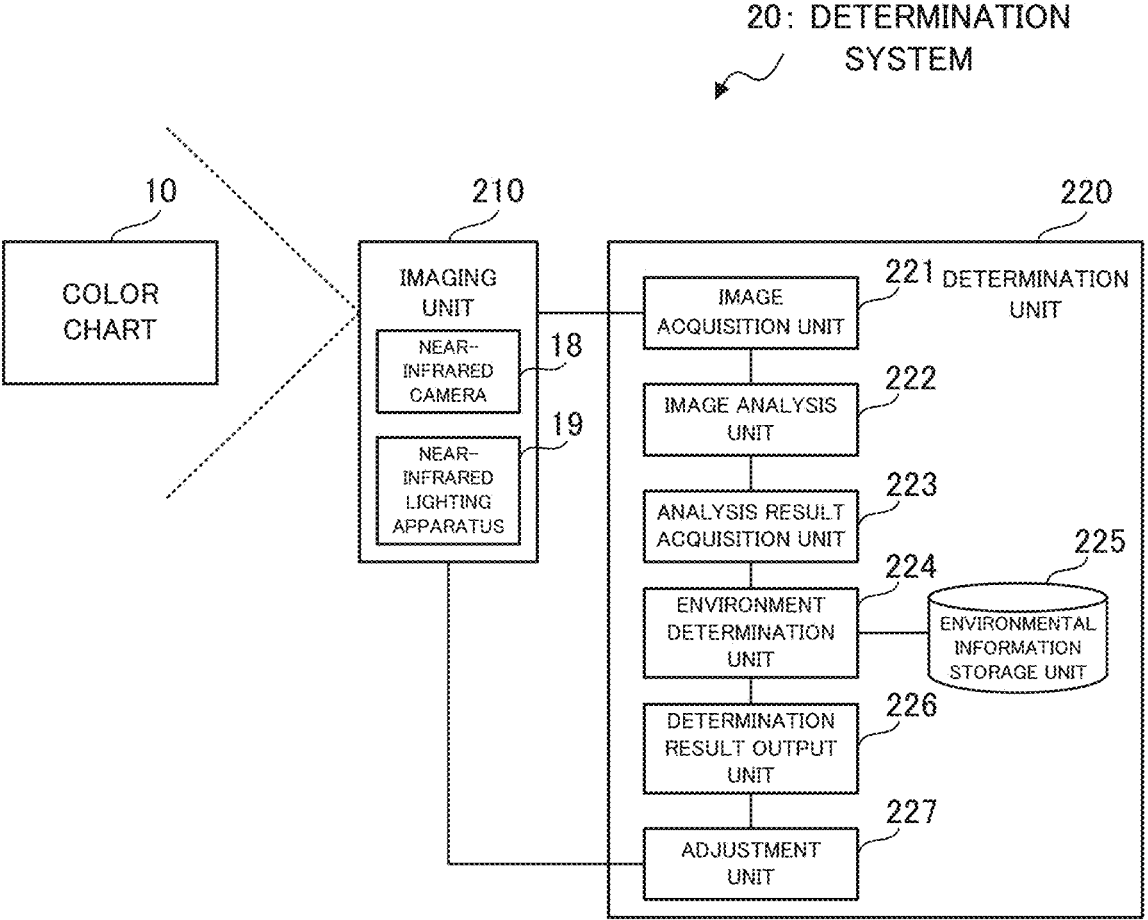
FIG. 16 is a block diagram illustrating a functional configuration of a determination system according to a tenth example embodiment.

As illustrated in FIG. 16, the determination system 20 according to the tenth example embodiment includes, as processing blocks for realizing the functions thereof, the imaging unit 210 and the determination unit 220. Then, the determination unit 220 according to the tenth example embodiment further includes an adjustment unit 227, in addition to the configuration in the eighth example embodiment (see FIG. 12).

The adjustment unit 227 is configured to automatically adjust the direction and intensity of the near-infrared rays in the imaging unit 210, on the basis of the determination result of the environment determination unit 224. Specifically, the adjustment unit 227 is configured to adjust the direction and intensity of the near-infrared rays in the imaging unit 210 so as to improve the imaging environment, when it is determined that the imaging environment is not an environment suitable for biometric authentication. For example, when it is determined that the imaging environment is not suitable for biometric authentication due to the fact that a way of irradiation with the near-infrared rays is too strong (i.e., the image is too bright), the adjustment unit 227 may perform adjustment to change the direction of the near-infrared rays to be removed from the subject, or to weaken the intensity. On the other hand, when it is determined that the imaging environment is not suitable for biometric authentication due to the fact that the way of irradiation with the near-infrared rays is too weak (i.e., the image is too dark), the adjustment unit 227 may perform adjustment to change the direction of the near-infrared rays toward the subject, or to increase the intensity. As in the ninth example embodiment described above, when the images of the chart 10 are captured at a plurality of points, the adjustment unit 227 may adjust the imaging environment in accordance with the determination result at each point (i.e., the determination result based on each of the images at the plurality of points). In this case, the adjustment unit 227 may perform the adjustment in timing when the subject passes through a corresponding point. For example, when it is determined to be dark at a point of 1.5 m from the near-infrared camera 18, the adjustment unit 227 may adjust the direction and the intensity of the near-infrared lighting apparatus 19 in timing when the subject passes through the point.
(Flow of Operation)

Next, with reference to FIG. 17, a flow of operation of the determination system 20 according to the tenth example embodiment will be described. FIG. 17 is a flowchart illustrating the flow of the operation of the determination system according to the tenth example embodiment. In FIG. 17, the same steps as those illustrated in FIG. 13 carry the same reference numerals. As illustrated in FIG. 17, in operation of the determination system 20 according to the tenth example embodiment, first, the imaging unit 210 captures the image of the chart 10 (step S201).

Subsequently, the image acquisition unit 221 obtains the image of the chart 10 captured by the imaging unit 210 (step S202). Then, the image analysis unit 222 analyzes the image of the chart 10 obtained by the image acquisition unit 221 (step S203).

Subsequently, the analysis result acquisition unit 223 obtains the analysis result of the image analysis unit 222 (step S204). Then, the environment determination unit 224 determines whether or not the current imaging environment is suitable for biometric authentication, on the basis of the analysis result obtained by the analysis result acquisition unit 223 and the information read from the environmental information storage unit 225 (step S205).

When it is determined that the imaging environment is suitable for biometric authentication (step S205: YES), the determination result output unit 226 outputs information indicating that it is an appropriate environment (step S206).

On the other hand, when it is determined that the imaging environment is not suitable for biometric authentication (step S205: NO), the adjustment unit 227 adjusts the light environment (e.g., the direction and intensity of the near-infrared rays) in the imaging (step S301). Then, the determination result output unit 226 outputs information indicating that the light environment is adjusted (step S302). In this case, the determination result output unit 226 may output information indicating to what extent the direction and intensity of the near-infrared rays are changed. The determination result output unit 226 may also output information indicating that the imaging environment is set suitable for biometric authentication as a result of the adjustment of the direction and intensity of the near-infrared rays.
(Technical Effect)

Next, a technical effect obtained by the determination system 20 according to the tenth example embodiment will be described.

Figure 17:
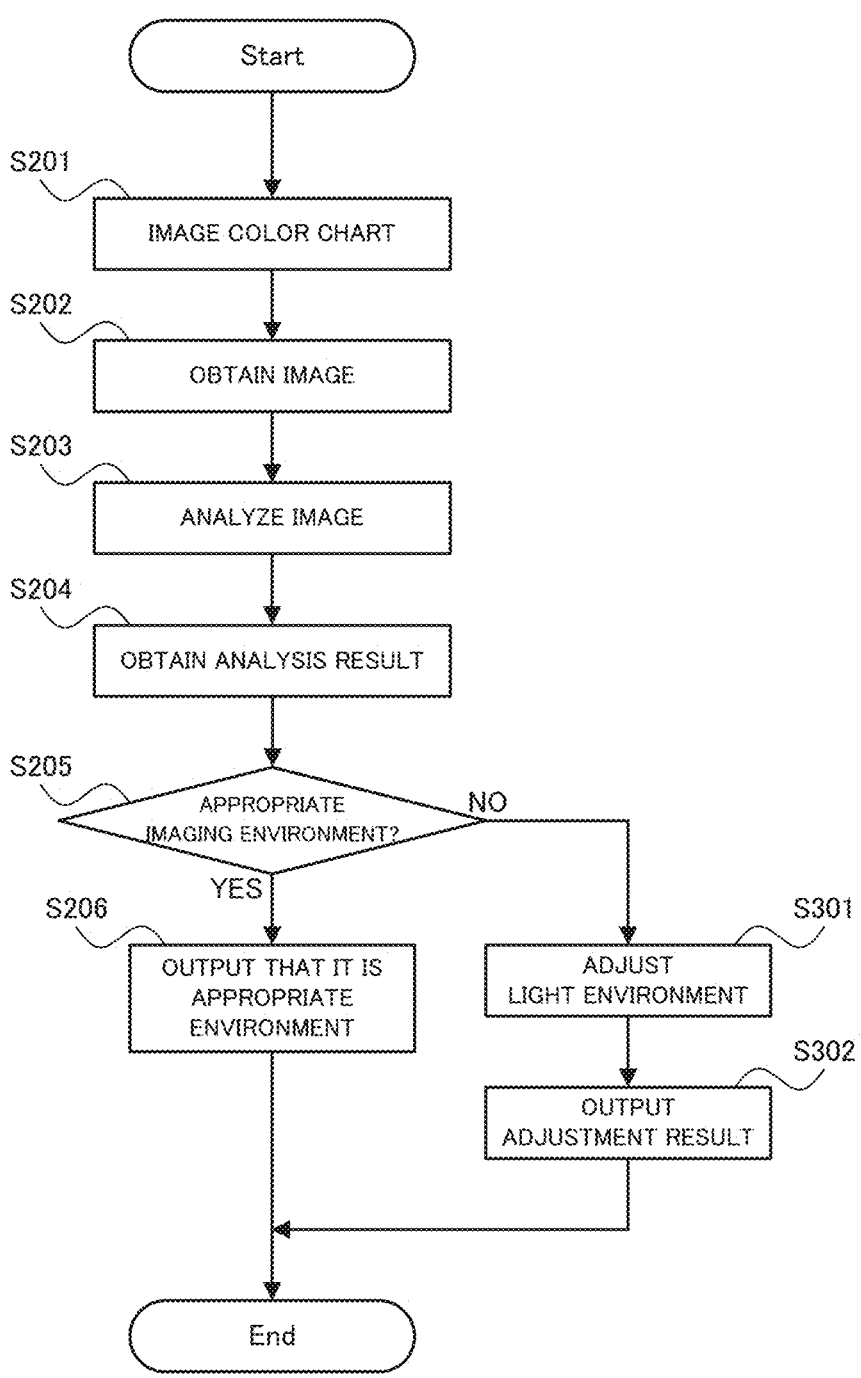
FIG. 17 is a flowchart illustrating a flow of operation of the determination system according to the tenth example embodiment.

As described in FIG. 16 and FIG. 17, in the determination system 20 according to the tenth example embodiment, the light environment in the imaging is adjusted in accordance with the determination result. In this way, even when the current imaging environment is not suitable for biometric authentication, it is automatically improved by adjusting the direction and strength of the near-infrared rays or the like, for example. It is therefore possible to perform the biometric authentication in an appropriate environment.

Eleventh Example Embodiment

The determination system 20 according to an eleventh example embodiment will be described with reference to FIG. 18 and FIG. 19. The eleventh example embodiment is partially different from the eighth to tenth example embodiments only in the configuration and operation, and may be the same as the eighth and tenth example embodiments in the other parts. For this reason, a part that is different from each of the example embodiments described above will be described in detail below, and a description of other overlapping parts will be omitted as appropriate.
(Functional Configuration)

First, a functional configuration of the determination system 20 according to the eleventh example embodiment will be described with reference to FIG. 18. FIG. 18 is a block diagram illustrating the functional configuration of the determination system according to the eleventh example embodiment. In FIG. 18, the same components as those illustrated in FIG. 12 carry the same reference numerals.

Figure 18:
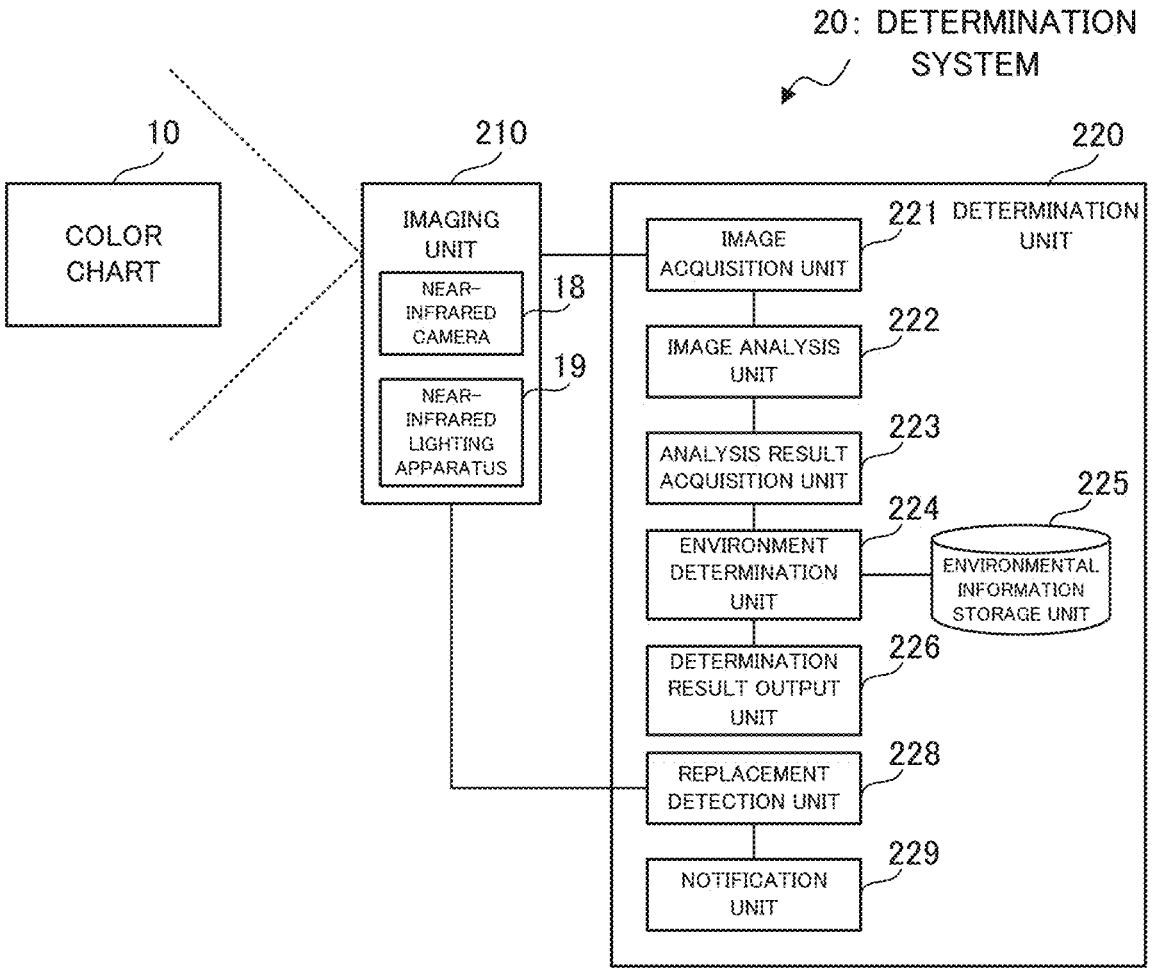
FIG. 18 is a block diagram illustrating a functional configuration of a determination system according to an eleventh example embodiment.

As illustrated in FIG. 18, the determination system 20 according to the eleventh example embodiment includes, as processing blocks for realizing the functions thereof, the imaging unit 210 and the determination unit 220. Then, the determination unit 220 according to the eleventh example embodiment further includes a replacement detection unit 228 and a notification unit 229, in addition to the configuration in the eighth example embodiment (see FIG. 12).

The replacement detection unit 228 is configured to detect that at least one of the near-infrared camera 18 and the near-infrared lighting apparatus 19 in the imaging unit 210 is replaced. The replacement detection unit 228 may detect that the replacement is performed when the near-infrared camera 18 or the near-infrared lighting apparatus 19 is disconnected, for example. Alternatively, the replacement detection unit 228 may store the specific number of the near-infrared camera 18 and the near-infrared lighting apparatus 19, and may detect that the replacement is performed when the specific number changes.

The notification unit 229 is configured to give notice that encourages re-adjustment of the imaging environment, when the replacement of at least one of the near-infrared camera 18 and the near-infrared lighting apparatus 19 is detected by the replacement detection unit 228. The notification unit 229 may capture the image of the chart 10 again, and may give notice to perform the adjustment corresponding to the determination result. The notification unit 229 may give notice by using a display or a speaker, for example.

(Flow of Operation)

Next, with reference to FIG. 19, a flow of an operation of giving notice of the readjustment (hereinafter referred to as a "notification operation" as appropriate) by the determination system 20 according to the eleventh example embodiment will be described. FIG. 19 is a flowchart illustrating the flow of the notification operation of the determination system according to the eleventh example embodiment.

Figure 19:
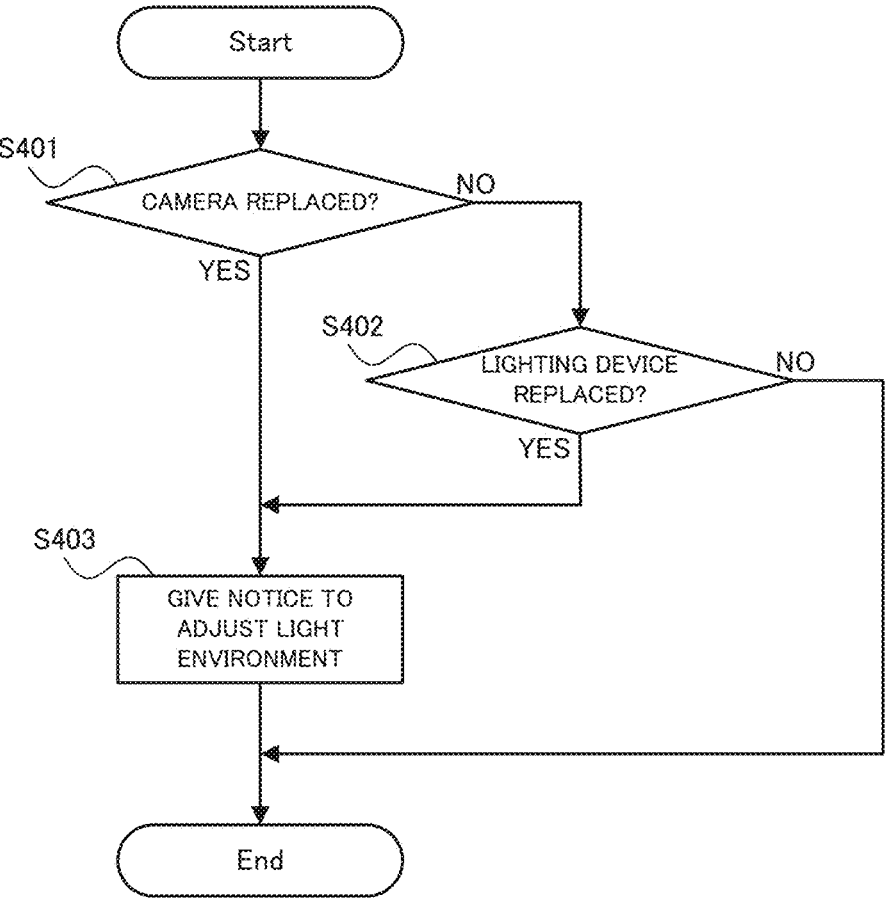
FIG. 19 is a flowchart illustrating a flow of a notification operation of the determination system according to the eleventh example embodiment.

As illustrated in FIG. 19, when the notification operation of the determination system 20 according to the eleventh example embodiment is performed, first, the notification unit 229 determines whether the replacement of the near-infrared camera 18 is detected in the replacement detection unit 228 (step S401). When the replacement of the near-infrared camera 18 is detected (step S401: YES), the notification unit 229 outputs the notice that encourages the re-adjustment of the imaging environment (step S403).

On the other hand, when the replacement of the near-infrared camera 18 is not detected (step S401: NO), the notification unit 229 determines whether or not the replacement of the near-infrared lighting apparatus 19 is detected in the replacement detection unit 228 (step S402). When the replacement of the near-infrared lighting apparatus 19 is detected (step S402: YES), the notification unit 229 outputs the notice that encourages the re-adjustment of the imaging environment (step S403). The notification content of the notification unit 229 may be different between when the replacement of the near-infrared camera 18 is detected and when the replacement of the near-infrared lighting apparatus 19 is detected.

When both the replacement of the near-infrared camera 18 and the replacement of the near-infrared lighting apparatus 19 are not detected in the replacement detection unit 228 (step S402: NO), the subsequent process is omitted, and a series of the notification operation is ended (i.e., the operation is ended without the notification by the notification unit 229).

(Technical Effect)

Next, a technical effect obtained by the determination system 20 according to the eleventh example embodiment will be described.

As described in FIG. 18 and FIG. 19, in the determination system 20 according to the eleventh example embodiment, when the replacement of at least one of the near-infrared camera 18 and the near-infrared lighting apparatus 19 is detected, the notification that encourages the re-adjustment of the imaging environment is given. In this way, even when the imaging environment is changed by the replacement of the near-infrared camera 18 and the near-infrared lighting apparatus 19, it is possible to improve the imaging environment at an early stage.

Twelfth Example Embodiment

The determination system 20 according to a twelfth example embodiment will be described with reference to FIG. 20 and FIG. 21. The twelfth example embodiment is partially different from the eighth to eleventh example embodiments only in the configuration and operation, and may be the same as the eighth and eleventh example embodiments in the other parts. For this reason, a part that is different from each of the example embodiments described above will be described in detail below, and a description of other overlapping parts will be omitted as appropriate.

(Functional Configuration)

First, with reference to FIG. 20, a functional configuration of the determination system 20 according to the twelfth example embodiment will be described. FIG. 20 is a block diagram illustrating the functional configuration of the determination system according to the twelfth example embodiment. In FIG. 20, the same components as those illustrated in FIG. 12 and FIG. 18 carry the same reference numerals.

Figure 20:
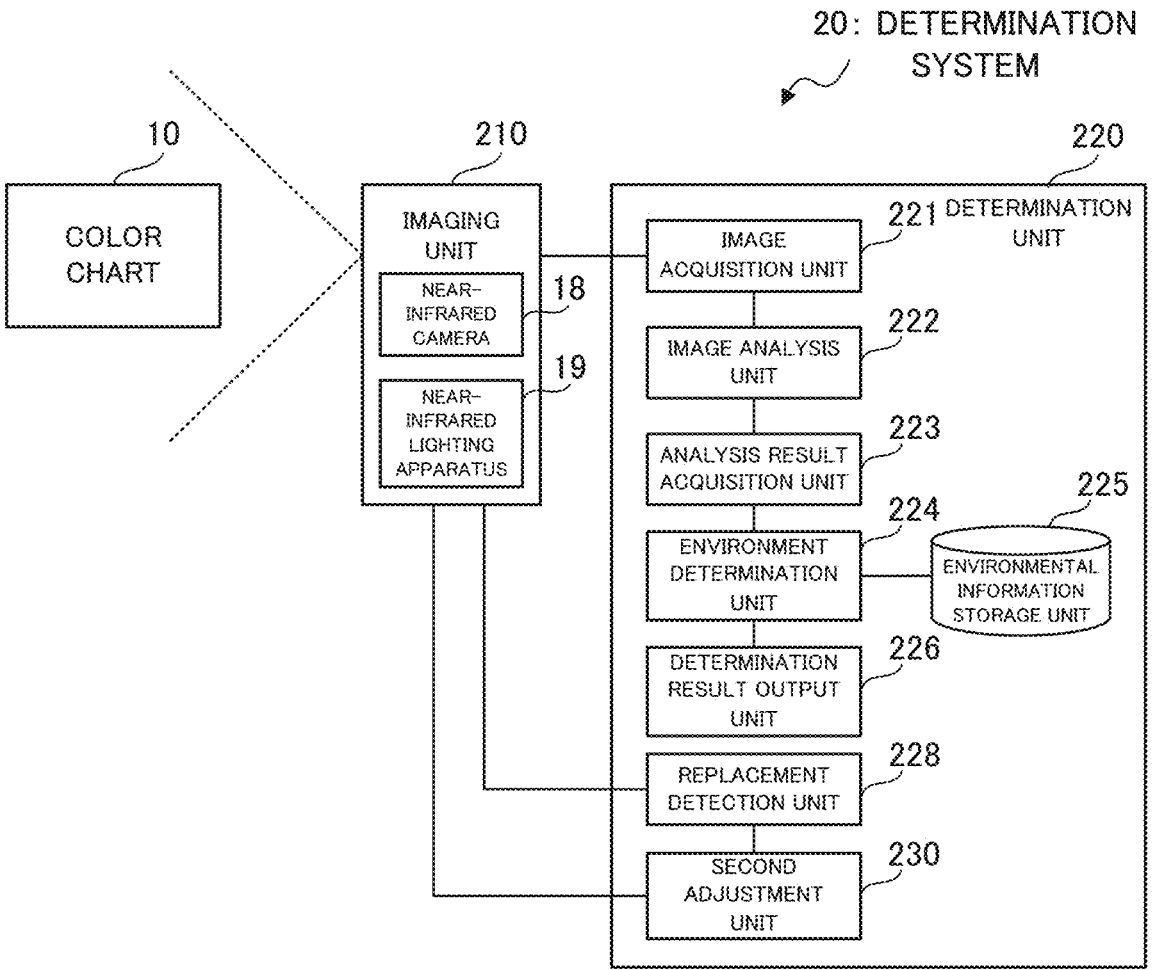
FIG. 20 is a block diagram illustrating a functional configuration of a determination system according to a twelfth example embodiment.

As illustrated in FIG. 20, the determination system 20 according to the twelfth example embodiment includes, as processing blocks for realizing the functions thereof, the imaging unit 210 and the determination unit 220. Then, the determination unit 220 according to the twelfth example embodiment further includes a replacement detection unit 228 and a second adjustment unit 230, in addition to the configuration in the eighth example embodiment (see FIG. 12). The replacement detection unit 228 may be the same as that described in the eleventh example embodiment.

The second adjustment unit 230 is configured to adjust the imaging environment to be appropriate, when the replacement of at least one of the near-infrared camera 18 and the near-infrared lighting apparatus 19 is detected by the replacement detection unit 228. Specifically, the second adjustment unit 230 is configured to adjust the imaging environment, on the basis of a difference between a first image obtained by imaging the chart 10 before the replacement of the near-infrared camera 18 or the near-infrared lighting apparatus 19 and a second image obtained by imaging the chart after the replacement of the near-infrared camera 18 or the near-infrared lighting apparatus 19. For example, the second adjustment unit 230 may adjust the direction, intensity, or the like of the near-infrared lighting apparatus 19 to reduce the the difference between the first image and the second image. The second adjustment unit 230 may store a table or the like indicating an adjustment amount corresponding to a difference value. The adjustment by the second adjustment unit 230 may be performed while a video is captured, and the second adjustment unit 230 may end the adjustment in timing when the difference becomes sufficiently small. The second adjustment unit 230 may output information for adjusting (e.g., an adjustment amount) without automatically performing the adjustment, and may provide an instruction to manually perform the adjustment.

(Flow of Operation)

Next, with reference to FIG. 21, a flow of an operation of adjusting the imaging environment (hereinafter referred to as an "adjustment operation" as appropriate) by the determination system 20 according to the twelfth example embodiment will be described. FIG. 21 is a flowchart illustrating the flow of the adjustment operation of the determination system according to the twelfth example embodiment.

Figure 21:
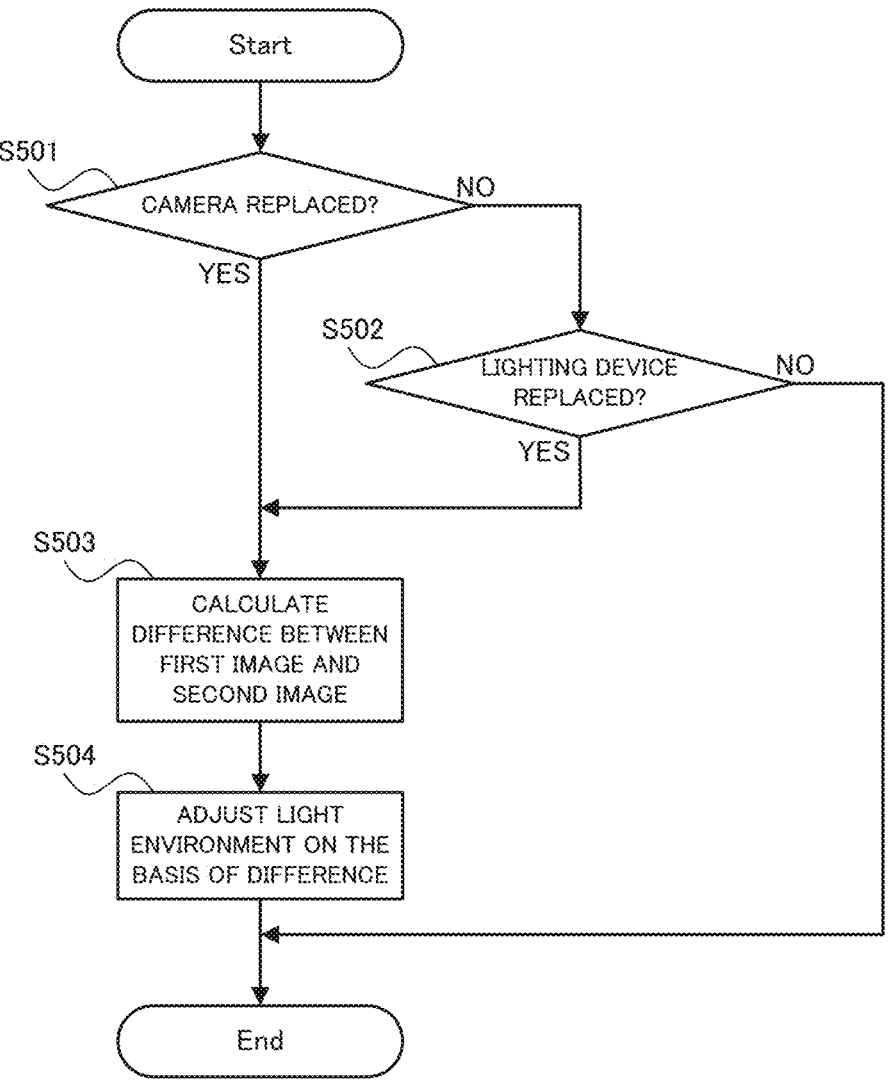
FIG. 21 is a flowchart illustrating a flow of an adjustment operation of the determination system according to the twelfth example embodiment.

As illustrated in FIG. 21, when the adjustment operation of the determination system 20 according to the twelfth example embodiment is performed, first, the second adjustment unit 230 determines whether or not the replacement of the near-infrared camera 18 is detected in the replacement detection unit 228 (step S501). When the replacement of the near-infrared camera 18 is detected (step S501: YES), the second adjustment unit 230 calculates the difference between the first image and the second image that are captured before the replacement (step S503). Then, the second adjustment unit 230 adjusts the imaging environment on the basis of the calculated difference (step S504).

On the other hand, when the replacement of the near-infrared camera 18 is not detected (step S501: NO), the second adjustment unit 230 determines whether or not the replacement of the near-infrared lighting apparatus 19 is detected in the replacement detection unit 228 (step S502). When the replacement of the near-infrared lighting apparatus 19 is detected (step S502: YES), the second adjustment unit 230 calculates the difference between the first image and the second image that are captured before the replacement (step S503). Then, the second adjustment unit 230 adjusts the imaging environment on the basis of the calculated difference (step S504).

When both the replacement of the near-infrared camera 18 and the replacement of the near-infrared lighting apparatus 19 are not detected in the replacement detection unit 228 (step S502: NO), the subsequent process is omitted, and a series of the notification operation is ended the subsequent process is omitted, and a series of the adjustment operation is ended (i.e., the operation is ended without the adjustment by the second adjustment unit 230).

(Technical Effect)

Next, a technical effect obtained by the determination system 20 according to the twelfth example embodiment will be described.

As described in FIG. 20 and FIG. 21, in the determination system 20 according to the twelfth example embodiment, when the replacement of at least one of the near-infrared camera 18 and the near-infrared lighting apparatus 19 is detected, the imaging environment is adjusted on the basis of the difference between the image before the replacement and the image after the replacement. In this way, even when the imaging environment is changed by the replacement of the near-infrared camera 18 and the near-infrared lighting apparatus 19, it is possible to improve the imaging environment, automatically.

Thirteenth Example Embodiment

The determination system 20 according to a thirteenth example embodiment will be described with reference to FIG. 22 to FIG. 24. The thirteenth example embodiment is partially different from the eighth to twelfth example embodiments only in the configuration and operation, and may be the same as the eighth and twelfth example embodiments in the other parts. For this reason, the parts different from the previously described example embodiments will be described in detail below, and other overlapping parts will be omitted from description as appropriate.

(Functional Configuration)

First, with reference to FIG. 22, a functional configuration of the determination system 20 according to the thirteenth example embodiment will be described. FIG. 22 is a block diagram illustrating the functional configuration of the determination system according to the thirteenth example embodiment. In FIG. 22, the same components as those illustrated in FIG. 12 carry the same reference numerals.

Figure 22:
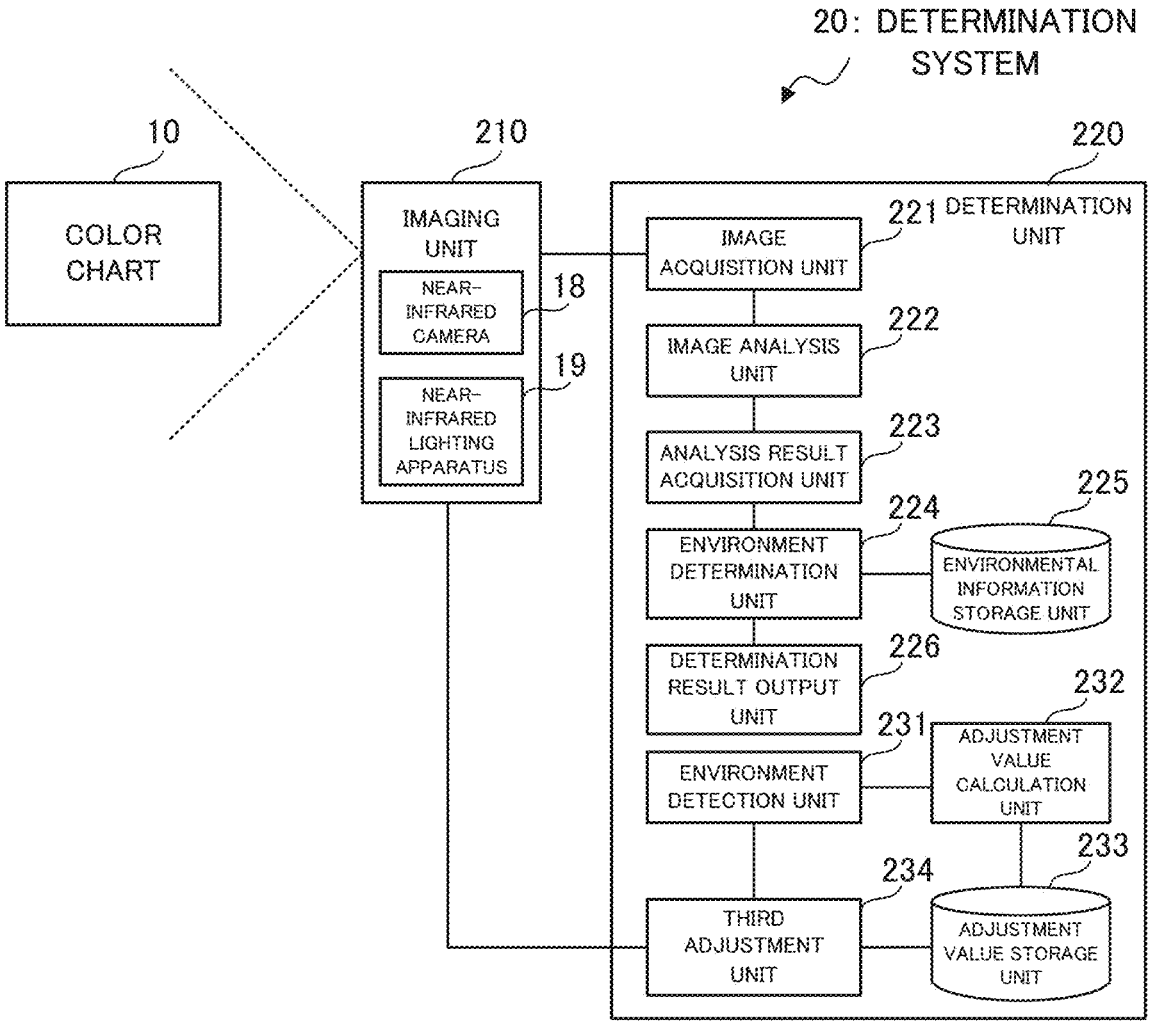
FIG. 22 is a block diagram illustrating a functional configuration of a determination system according to a thirteenth example embodiment.

As illustrated in FIG. 22, the determination system 20 according to the thirteenth example embodiment includes, as processing blocks for realizing the functions thereof, the imaging unit 210 and the determination unit 220. The determination unit 220 according to the twelfth example embodiment further includes an environment detection unit 231, an adjustment value calculation unit 232, an adjustment value storage unit 233, and a third adjustment unit 234, in addition to the configuration in the eighth example embodiment (see FIG. 12).

The environment detection unit 231 is configured to detect an environmental condition such as a season, a time zone, and weather. A detailed description of a method of detecting the environmental condition will be omitted here, because existing techniques/technologies may be adopted to the method as appropriate. A detection result of the environment detection unit 231 (i.e., information about the environmental condition) is outputted to the adjustment value calculation unit 232 and the third adjustment unit 234.

The adjustment value calculation unit 232 is configured to calculate an adjustment value for adjusting the imaging environment, on the basis of the plurality of images of the chart 10 that are captured under different environmental conditions. The adjustment value may indicate an amount of change in a parameter that influences the light environment (e.g., the direction and intensity of the near-infrared lighting apparatus 19, etc.), for example. The adjustment value calculated by the adjustment value calculating unit 232 is configured to be outputted to the adjustment value storage unit 233.

The adjustment value storage unit 233 is configured to store the adjustment value calculated by the adjustment value calculating unit 232, for each environmental condition. For example, the adjustment value storage unit 233 may be configured to store a different adjustment for each season (spring, summer, autumn, winter, etc.). The adjustment value storage unit 233 may be configured to store a different adjustment for each time zone (morning, daytime, evening, night, etc.). The adjustment value storage unit 233 may be configured to store a different adjustment for each weather (sunny, cloudy, rainy, etc.). The adjustment value stored in the adjustment value storage unit 233 is readable by the third adjustment unit 234 as appropriate.

The third adjustment unit 234 is configured to adjust the imaging environment, by reading the adjustment value corresponding to a current environmental condition from the adjustment value storage unit 233, and by reflecting the adjustment value in the imaging unit 210. For example, when the current imaging environment is "spring", "daytime", and "sunny", the third adjustment unit 234 may be configured to adjust the direction, intensity, or the like of the near-infrared lighting apparatus 19 on the basis of the adjustment value corresponding to the imaging environmental conditions. The third adjustment unit 234 may output information for performing the adjustment (e.g., an adjustment amount) without automatically performing the adjustment, and may provide an instruction to manually perform the adjustment.

(Adjustment Value Storage Operation)

Next, with reference to FIG. 23, a flow of an operation of calculating and storing the adjustment value (hereinafter referred to as an "adjustment value storage operation" as appropriate) by the determination system 20 according to the thirteenth example embodiment will be described. FIG. 23 is a flowchart illustrating the flow of the adjustment value storage operation of the determination system according to the twelfth example embodiment.

Figure 23:
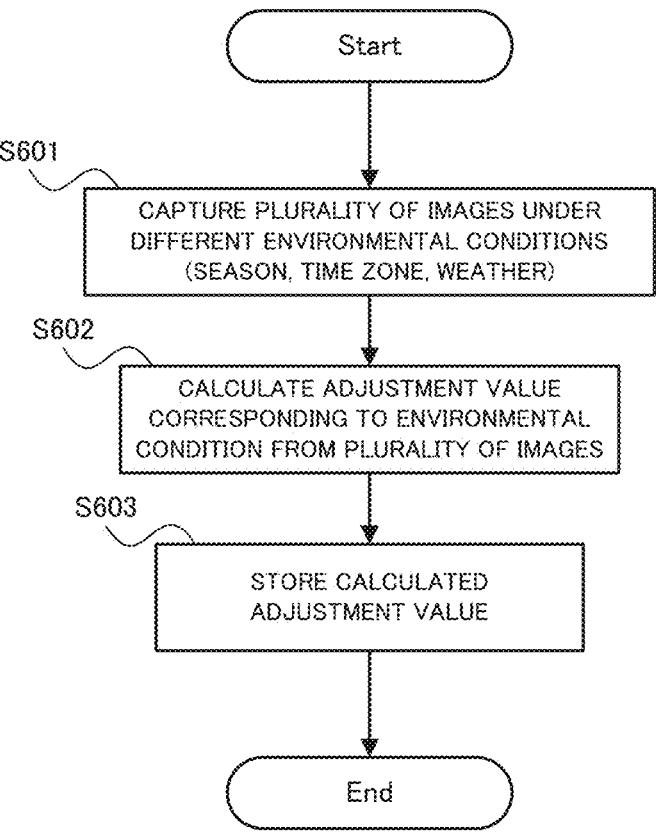
FIG. 23 is a flowchart illustrating a flow of an adjustment value storage operation of the determination system according to the thirteenth example embodiment.

As illustrated in FIG. 23, when the adjustment value storage operation of the determination system 20 according to the thirteenth example embodiment is performed, first, the imaging unit 210 captures the plurality of images under different environmental conditions (step S601). The imaging unit 210 may capture the image at each time when the environmental condition detected by the environment detection unit 231 changes, for example.

Subsequently, the adjustment value calculation unit 232 calculates the adjustment value for adjusting the imaging environment on the basis of the plurality of images of the chart 10 captured under different environmental conditions (step S602). Then, the adjustment value storage unit 233 stores the adjustment value calculated by the adjustment value calculation unit 232 for each environmental condition (step S603).

It is possible to perform display for confirming to which environmental condition the adjustment value is stored. For example, when the adjustment values corresponding to sunny or cloudy are stored, but the adjustment value corresponding to rainy is not stored, a list indicating sunny "○", cloudy "○", and rainy "x" may be displayed.

(Adjustment Value Reflection Operation)

Next, with reference to FIG. 24, a flow of an operation of adjusting the imaging environment by reflecting the adjustment value (hereinafter referred to as an "adjustment value reflection operation") by the determination system 20 according to the thirteenth example embodiment will be described. FIG. 24 is a flowchart illustrating the flow of the adjustment value reflection operation of the determination system according to the thirteenth example embodiment.

Figure 24:
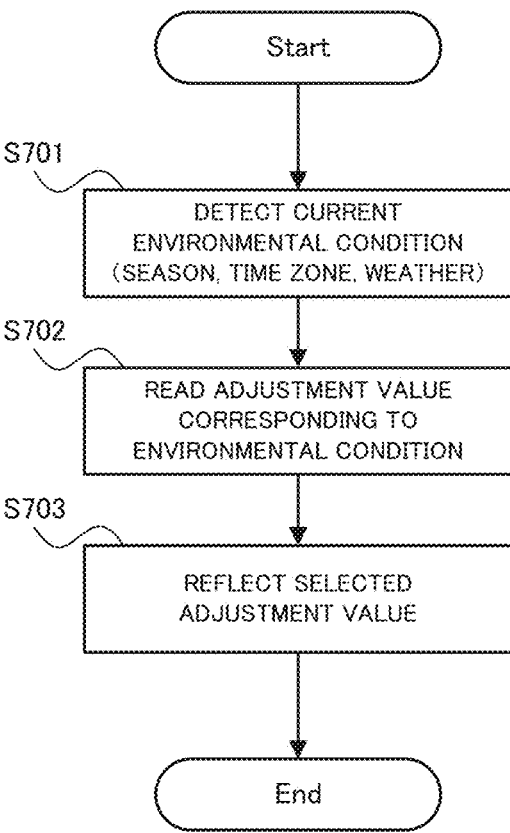
FIG. 24 is a flowchart illustrating a flow of an adjustment value reflection operation of the determination system according to the thirteenth example embodiment.

As illustrated in FIG. 24, when the adjustment value reflection operation of the determination system 20 according to the thirteenth example embodiment is performed, first, the environment detection unit 231 detects the current imaging environment (step S701).

Subsequently, the third adjustment unit 234 reads the adjustment value corresponding to the current imaging environment from the adjustment value storage unit 233 (step S702). Then, the third adjustment unit 234 adjusts the imaging environment by reflecting the read adjustment value (step S703).

(Technical Effect)

Next, a technical effect obtained by the determination system 20 according to the thirteenth example embodiment will be described.

As described in FIG. 22 to FIG. 24, in the determination system 20 according to the thirteenth example embodiment, the imaging environment is adjusted in accordance with the environmental condition such as a season, a time zone, and weather. In this way, even when the imaging environment changes due to a change in the environmental condition, it is possible to improve the imaging environment, automatically.

A processing method in which a program for allowing the configuration in each of the example embodiments to operate so as to realize the functions of each example embodiment is recorded on a recording medium, and in which the program recorded on the recording medium is read as a code and executed on a computer, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and executes processing alone, but also the program that operates on an OS and executes processing in cooperation with the functions of expansion boards and another software, is also included in the scope of each of the example embodiments.

This disclosure is not limited to the examples described above and is allowed to be changed, if desired, without departing from the essence or spirit of this disclosure which can be read from the claims and the entire specification. A chart, a manufacturing method, a determination system, a determination method, and a recording medium with such changes are also intended to be within the technical scope of this disclosure.

SUPPLEMENTARY NOTES

The example embodiments described above may be further described as, but not limited to, the following Supplementary Notes below.

(Supplementary Note 1)

A chart according to Supplementary Note 1 is a chart including: a substrate; a first skin reflection patch part that is formed on the substrate and that simulates reflection of near-infrared rays of a predetermined wavelength, in a skin of a living body of a first skin color; and a second skin reflection patch part that is formed on the substrate and that simulates reflection of the near-infrared rays of the predetermined wavelength, in the skin of the living body of a second skin color that is different from the first skin color.

(Supplementary Note 2)

A chart according to Supplementary Note 2 is the chart according to Supplementary Note 1, wherein at least one of the first skin reflection patch part and the second skin reflection patch part includes: a first patch part that simulates reflection of near-infrared rays of a first wavelength, in the skin of the living body, and a second patch part that simulates reflection of near-infrared rays of a second wavelength that is different from the first wavelength, in the skin of the living body (Supplementary Note 3)

A method of manufacturing a chart according to Supplementary Note 3 is a method of manufacturing a chart, the method including: forming, on a substrate, a first skin reflection patch part that simulates reflection of near-infrared rays of a predetermined wavelength, in a skin of a living body of a first skin color; and forming, on the substrate, a second skin reflection patch part that simulates reflection of the near-infrared rays of the predetermined wavelength, in the skin of the living body of a second skin color that is different from the first skin color.

(Supplementary Note 4)

A determination system according to Supplementary Note 4 is a determination system including: an imaging unit; a lighting apparatus that applies near-infrared rays of a predetermined wavelength to an imaging target of the imaging unit; and a determination unit that determines whether or not a light environment in imaging by the imaging unit is suitable for biometric authentication, on the basis of an image that is captured by applying the near-infrared rays of the predetermined wavelength to a chart, which includes: a substrate; a first skin reflection patch part that is formed on the substrate and that simulates reflection of near-infrared rays of a predetermined wavelength, in a skin of a living body of a first skin color; and a second skin reflection patch part that is formed on the substrate and that simulates reflection of the near-infrared rays of the predetermined wavelength, in the skin of the living body of a second skin color that is different from the first skin color.

(Supplementary Note 5)

A determination system according to Supplementary Note 5 is the determination system according to Supplementary Note 4, wherein the determination unit determines whether or not the light environment in the imaging by the imaging unit is suitable for biometric authentication, on the basis of one or a plurality of images that are captured by disposing the chart at different distances from the imaging unit.

(Supplementary Note 6)

A determination system according to Supplementary Note 6 is the determination system according to Supplementary Note 4 or 5, further including an adjustment unit that adjusts the light environment in the imaging by the imaging unit, on the basis of a determination result.

(Supplementary Note 7)

A determination system according to Supplementary Note 7 is the determination device according to any one of Supplementary Notes 4 to 6, further including a notification unit that outputs notice that encourages adjustment of the light environment in the imaging by the imaging unit, when at least one of the imaging unit and the lighting apparatus is replaced.

(Supplementary Note 8)

A determination system according to Supplementary Note 8 is the determination system according to any one of Supplementary Notes 4 to 7, further including a second adjustment unit that adjusts the light environment in the imaging by the imaging unit, on the basis of a difference between a first image obtained by imaging the chart before replacement and a second image obtained by imaging the chart after replacement, when at least one of the imaging unit and the lighting apparatus is replaced.

(Supplementary Note 9)

A determination system according to Supplementary Note 9 is the determination system according to any one of Supplementary Notes 4 to 8, further including: an adjustment value calculation unit that calculates an adjustment value for adjusting the light environment in the imaging by the imaging unit, on the basis of a plurality of images of the chart that are captured in a situation in which at least one of a season, a time zone, and weather is different; and a third adjustment unit that adjusts the light environment in the imaging by the imaging unit, by reflecting the adjustment value corresponding to at least one of a current season, a current time zone, and current weather.

(Supplementary Note 10)

A determination method according to Supplementary Note 10 is a determination method that is executed by a computer, the determination method including: capturing an image by applying near-infrared rays of a predetermined wavelength to a chart, which includes: a substrate; a first skin reflection patch part that is formed on the substrate and that simulates reflection of near-infrared rays of a predetermined wavelength, in a skin of a living body of a first skin color; and a second skin reflection patch part that is formed on the substrate and that simulates reflection of the near-infrared rays of the predetermined wavelength, in the skin of the living body of a second skin color that is different from the first skin color; and determining whether or not a light environment in capturing the image is suitable for biometric authentication, on the basis of the image.

(Supplementary Note 11)

A recording medium according to Supplementary Note 11 is a recording medium on which a computer program that allows a computer to execute a determination method is recorded, the determination method including: capturing an image by applying near-infrared rays of a predetermined wavelength to a chart, which includes: a substrate; a first skin reflection patch part that is formed on the substrate and that simulates reflection of near-infrared rays of a predetermined wavelength, in a skin of a living body of a first skin color; and a second skin reflection patch part that is formed on the substrate and that simulates reflection of the near-infrared rays of the predetermined wavelength, in the skin of the living body of a second skin color that is different from the first skin color; and determining whether or not a light environment in capturing the image is suitable for biometric authentication, on the basis of the image.

(Supplementary Note 12)

A computer program according to Supplementary Note 12 is a computer program that allows a computer to execute a determination method, the determination method including: capturing an image by applying near-infrared rays of a predetermined wavelength to a chart, which includes: a substrate; a first skin reflection patch part that is formed on the substrate and that simulates reflection of near-infrared rays of a predetermined wavelength, in a skin of a living body of a first skin color; and a second skin reflection patch part that is formed on the substrate and that simulates reflection of the near-infrared rays of the predetermined wavelength, in the skin of the living body of a second skin color that is different from the first skin color; and determining whether or not a light environment in capturing the image is suitable for biometric authentication, on the basis of the image.

DESCRIPTION OF REFERENCE CODES

10 Chart
18 Near-infrared camera
19 Near-infrared lighting apparatus
20 Determination system
100 Substrate
110 First skin reflection patch part
111 First patch part
112 Second patch part
113 First white color display part
120 Second skin reflection patch part
121 Third patch part
122 Fourth patch part
123 Second white color display part
210 Imaging unit
220 Determination unit
221 Image acquisition unit
222 Image analysis unit
223 Analysis result acquisition unit
224 Environment determination unit
225 Environmental information storage unit
226 Determination result output unit
227 Adjustment unit
228 Replacement detection unit
229 Notification unit
230 Second adjustment unit
231 Environment detection unit
232 Adjustment value calculation unit
233 Adjustment value storage unit
234 Third adjustment unit

What is claimed is:

1. A determination system comprising:

an imaging unit comprising a camera;

a light source that applies near-infrared rays of a predetermined wavelength to an imaging target of the imaging unit;

at least one memory that is configured to store instructions; and at least one processor that is configured to execute the instructions to:

determine whether or not a light environment in imaging by the imaging unit is suitable for biometric authentication, on the basis of an image that is captured by applying the near-infrared rays of the predetermined wavelength to a chart, which includes: a substrate; a first skin reflection patch coating that is formed on the substrate and that simulates reflection of near-infrared rays of a predetermined wavelength, in a skin of a living body of a first skin color; and a second skin reflection patch coating that is formed on the substrate and that simulates reflection of the near-infrared rays of the predetermined wavelength, in the skin of the living body of a second skin color that is different from the first skin color.

2. The determination system according to claim 1, wherein the at least one processor is configured to execute the instructions to determine whether or not the light environment in the imaging by the imaging unit is suitable for biometric authentication, on the basis of one or a plurality of images that are captured by disposing the chart at different distances from the imaging unit.

3. The determination system according to claim 1, wherein the at least one processor is configured to execute the instructions to adjust the light environment in the imaging by the imaging unit, on the basis of a determination result.

4. The determination device according to claim 1, wherein the at least one processor is configured to execute the instructions to output notice that encourages adjustment of the light environment in the imaging by the imaging unit, in a case where at least one of the imaging unit and the light source is replaced.

5. The determination system according to claim 1, wherein the at least one processor is configured to execute the instructions to adjust the light environment in the imaging by the imaging unit, on the basis of a difference between a first image obtained by imaging the chart before replacement and a second image obtained by imaging the chart after replacement, in a case where at least one of the imaging unit and the light source is replaced.

6. The determination system according to claim 1, wherein the at least one processor is configured to execute the instructions to:

calculate an adjustment value for adjusting the light environment in the imaging by the imaging unit, on the basis of a plurality of images of the chart that are captured in a situation in which at least one of a season, a time zone, and weather is different; and adjust the light environment in the imaging by the imaging unit, by reflecting the adjustment value corresponding to at least one of a current season, a current time zone, and current weather.

7. A determination method that is executed by a computer, the determination method including:

capturing an image by applying near-infrared rays of a predetermined wavelength to a chart, which includes: a substrate; a first skin reflection patch coating that is formed on the substrate and that simulates reflection of near-infrared rays of a predetermined wavelength, in a skin of a living body of a first skin color; and a second skin reflection patch coating that is formed on the substrate and that simulates reflection of the near-infrared rays of the predetermined wavelength, in the skin of the living body of a second skin color that is different from the first skin color; and determining whether or not a light environment in capturing the image is suitable for biometric authentication, on the basis of the image.

8. The determination method according to claim 7, further comprising determining whether or not the light environment in the imaging by the imaging unit is suitable for biometric authentication, on the basis of one or a plurality of images that are captured by disposing the chart at different distances from the imaging unit.

9. The determination method according to claim 7, further comprising adjusting the light environment in the imaging by the imaging unit, on the basis of a determination result.

10. The determination method according to claim 7, further comprising outputting notice that encourages adjustment of the light environment in the imaging by the imaging unit, in a case where at least one of the imaging unit and the light source is replaced.

11. The determination method according to claim 7, further comprising adjusting the light environment in the imaging by the imaging unit, on the basis of a difference between a first image obtained by imaging the chart before replacement and a second image obtained by imaging the chart after replacement, in a case where at least one of the imaging unit and the light source is replaced.

12. The determination method according to claim 7, further comprising:

calculating an adjustment value for adjusting the light environment in the imaging by the imaging unit, on the basis of a plurality of images of the chart that are captured in a situation in which at least one of a season, a time zone, and weather is different; and adjusting the light environment in the imaging by the imaging unit, by reflecting the adjustment value corresponding to at least one of a current season, a current time zone, and current weather.

* * * * *